United States Patent
Doan et al.

(10) Patent No.: US 9,925,897 B2
(45) Date of Patent: *Mar. 27, 2018

(54) DOOR TRIM ARMREST SUBSTRATE STRUCTURE

(71) Applicant: Ford Global Technologies, LLC, Dearborn, MI (US)

(72) Inventors: Linh Doan, Belleville, MI (US); Kenneth S. Laird, Canton, MI (US); Yudong Zhou, Troy, MI (US); Karen Judge, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/530,910

(22) Filed: Nov. 3, 2014

(65) Prior Publication Data

US 2015/0165943 A1 Jun. 18, 2015

Related U.S. Application Data

(63) Continuation-in-part of application No. 14/108,619, filed on Dec. 17, 2013.

(51) Int. Cl.
*B60N 2/46* (2006.01)
*B60R 13/02* (2006.01)
(Continued)

(52) U.S. Cl.
CPC ........ *B60N 2/466* (2013.01); *B29C 45/14336* (2013.01); *B29C 45/14778* (2013.01);
(Continued)

(58) Field of Classification Search
CPC ............ B29C 31/008; B29C 45/14008; B29C 45/14016; B29C 45/14024; B29C 45/14065; B29C 45/14262; B29C 45/14786; B29C 45/14819; B29C 2045/1404; B29C 2045/1427; B29C 2045/14278; B29C 70/68; B29C 70/683; B29C 70/687; B29C 70/688; B29C 70/70; B29C 70/72; B29C 70/74; B29C 70/76; B29C 45/14; B29C 45/1404;
(Continued)

(56) References Cited

U.S. PATENT DOCUMENTS 3,362,749 A 1/1968 Clement
3,387,881 A 6/1968 Stepanek et al.
(Continued)

FOREIGN PATENT DOCUMENTS

DE 1117375 B * 11/1961 ............. B29C 70/16
DE 3726827 A1 * 3/1988 ............. E04F 10/02
(Continued)

*Primary Examiner* — D Glenn Dayoan
*Assistant Examiner* — Paul Chenevert
(74) *Attorney, Agent, or Firm* — Vichit Chea; Price Heneveld LLP

(57) ABSTRACT

A vehicle armrest including a fabric member tensioned across a gap defined between inner and outer armrest substrates that are formed around a portion of the fabric member. At least one buckling member extends across the gap between the inner and outer armrest substrates and a cover member extends over and vertically supported by the fabric member.

20 Claims, 22 Drawing Sheets

(51) Int. Cl.
  *B29C 45/14* (2006.01)
  *B60N 2/42* (2006.01)
  *B60N 2/427* (2006.01)
  *B60N 2/58* (2006.01)
  B29C 31/00 (2006.01)
  B29C 70/76 (2006.01)
  B29C 70/68 (2006.01)
  B29L 31/30 (2006.01)

(52) U.S. Cl.
  CPC .. *B29C 45/14786* (2013.01); *B29C 45/14811* (2013.01); *B60N 2/42* (2013.01); *B60N 2/42709* (2013.01); *B60N 2/5825* (2013.01); *B60R 13/0243* (2013.01); B29C 45/14065 (2013.01); B29C 70/687 (2013.01); B29C 70/76 (2013.01); B29C 2045/1486 (2013.01); B29C 2045/14139 (2013.01); B29C 2045/14278 (2013.01); B29K 2713/00 (2013.01); B29K 2995/0053 (2013.01); B29L 2031/3005 (2013.01); B29L 2031/3026 (2013.01)

(58) Field of Classification Search
  CPC ........ B29C 45/14336; B29C 45/14778; B29C 45/14811; B29C 2045/14139; B29C 2045/1486; B60N 2/4235; B60N 2/42709; B60N 2/46; B60N 2/466; B60N 2/42; B60N 2/5825; B60R 13/0243; B60R 21/0428; B60R 2021/0414; Y10T 29/49863; B29K 2713/00; B29K 2995/0053; B29L 2031/3005; B29L 2031/302

See application file for complete search history.

(56) References Cited

U.S. PATENT DOCUMENTS

| | | | |
|---|---|---|---|
| 3,644,165 A * | 2/1972 | Chen | 428/110 |
| 4,025,974 A * | 5/1977 | Lea | A47C 27/084 5/709 |
| 4,386,989 A * | 6/1983 | Aubry | 156/182 |
| 4,743,323 A * | 5/1988 | Hettinga | 156/160 |
| 4,783,114 A | 11/1988 | Welch | |
| 5,181,759 A | 1/1993 | Doolittle | |
| 5,527,084 A | 6/1996 | Scherf | |
| 5,765,804 A * | 6/1998 | Stumpf et al. | 248/631 |
| 5,776,568 A * | 7/1998 | Andress et al. | 428/35.7 |
| 5,803,415 A | 9/1998 | Konishi et al. | |
| 5,939,165 A | 8/1999 | Oike et al. | |
| 6,475,576 B1 | 11/2002 | Ashtiani et al. | |
| 6,830,443 B1 * | 12/2004 | Coffey et al. | 425/116 |
| 6,893,077 B1 | 5/2005 | DeJongh | |
| 7,070,221 B2 | 7/2006 | Cowelchuk et al. | |
| 7,104,590 B2 | 9/2006 | Dooley et al. | |
| 7,121,611 B2 | 10/2006 | Hirotani et al. | |
| 7,247,382 B2 | 6/2007 | Gardner, Jr. | |
| 7,240,957 B2 * | 7/2007 | Dry | B60R 13/0243 29/91.1 |
| 7,387,326 B2 | 6/2008 | Osada | |
| 7,503,621 B2 | 3/2009 | Mani | |
| 7,647,714 B2 * | 1/2010 | Coffield | A47C 7/282 160/378 |
| 7,658,426 B2 | 2/2010 | Hayakawa et al. | |
| 7,677,873 B2 * | 3/2010 | Sayers | B29C 31/008 264/257 |
| 7,681,939 B2 | 3/2010 | Augustyn | |
| 7,726,726 B2 | 6/2010 | Cavallin et al. | |
| 7,731,268 B2 | 6/2010 | Motowski et al. | |
| 7,794,009 B2 | 9/2010 | Pinkerton et al. | |
| 7,794,010 B2 | 9/2010 | Saida et al. | |
| 7,828,388 B2 | 11/2010 | Thomas | |
| 7,871,119 B2 | 1/2011 | Schoemann et al. | |
| 8,157,309 B2 | 4/2012 | Ishikawa | |
| 8,172,311 B2 | 5/2012 | Hughes, Jr. et al. | |
| 8,424,954 B2 | 4/2013 | Hall et al. | |
| 9,145,076 B2 * | 9/2015 | Platzek | B60N 2/466 |
| 9,463,723 B2 * | 10/2016 | Hamdoon | B60N 2/4235 |
| 9,505,325 B2 * | 11/2016 | Doan | B60N 2/46 |
| 2005/0168003 A1 * | 8/2005 | Wolff et al. | 296/24.3 |
| 2005/0186388 A1 * | 8/2005 | Mekas et al. | 428/116 |
| 2006/0024474 A1 * | 2/2006 | Coffield | 428/131 |
| 2007/0035064 A1 * | 2/2007 | Coffield | 264/257 |
| 2007/0207292 A1 * | 9/2007 | Cowelchuk et al. | 428/174 |
| 2008/0038569 A1 * | 2/2008 | Evans et al. | 428/474.9 |
| 2011/0133531 A1 * | 6/2011 | Yeh | B60N 2/06 297/232 |
| 2012/0231215 A1 | 9/2012 | Hayashi | |
| 2014/0077517 A1 * | 3/2014 | Gutierrez et al. | 296/1.07 |
| 2014/0077524 A1 * | 3/2014 | Gutierrez et al. | 296/153 |
| 2015/0158448 A1 * | 6/2015 | Sundararajan | B60N 2/46 296/153 |
| 2015/0306992 A1 * | 10/2015 | Jayasuriya | B60N 2/466 297/411.22 |
| 2016/0176366 A1 * | 6/2016 | Sperl | B60R 13/0243 296/1.08 |
| 2016/0368402 A1 * | 12/2016 | Hamdoon | B60N 2/466 |

FOREIGN PATENT DOCUMENTS

| | | | | |
|---|---|---|---|---|
| DE | 102007027795 A1 * | 8/2008 | | B60N 3/00 |
| DE | 102008053232 A1 * | 7/2010 | | B60N 2/4235 |
| EP | 1621385 A1 * | 2/2006 | | B60J 7/22 |
| FR | 1455474 A * | 4/1966 | | B29C 15/08 |
| FR | 2997337 A1 * | 5/2014 | | B29C 45/14 |
| GB | 2514356 A * | 11/2014 | | B60N 2/46 |
| WO | WO 2009016609 A1 * | 2/2009 | | B62J 1/00 |
| WO | WO 2011078021 A1 * | 6/2011 | | B29C 33/14 |
| WO | WO 2012028605 A1 * | 3/2012 | | B60N 2/46 |

* cited by examiner

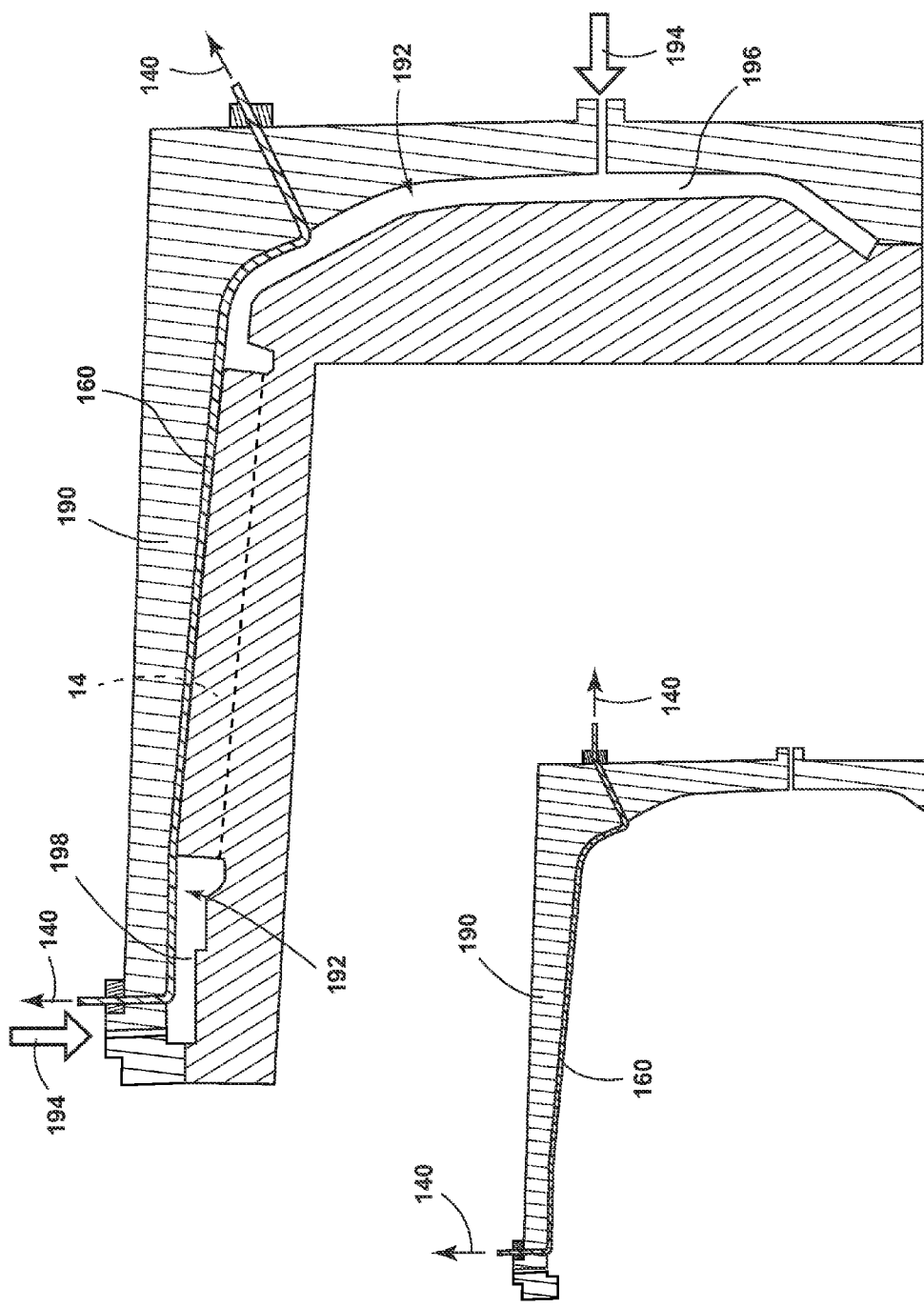

US 9,925,897 B2

DOOR TRIM ARMREST SUBSTRATE STRUCTURE

CROSS-REFERENCE TO RELATED APPLICATION

This patent application is a continuation-in-part of U.S. patent application Ser. No. 14/108,619 filed on Dec. 17, 2013, entitled "VEHICLE ARMREST WITH STRUCTURAL FABRIC SUBSTRATE."

FIELD OF THE INVENTION

The present invention generally relates to vehicle armrests, and more specifically, a vehicle armrest where at least a portion of the vertical support is provided by a fabric substrate.

BACKGROUND OF THE INVENTION

Vehicles contain various styles of armrests within door assemblies and also within side panels, where no door is present. Various armrests can include additional cushioning and handles, as well as other features such as storage compartments and cup holders. Because armrests project into the cabin space of the vehicle, they can present a potential hazard during a side impact condition placed upon the vehicle. In such an impact, the armrest can be forced further into the cabin area as a result of the impact.

SUMMARY OF THE INVENTION

According to at least one aspect of the present invention, a vehicle armrest includes a fabric member tensioned across a gap defined between inner and outer armrest substrates that are formed around a portion of the fabric member. At least one buckling member extends across the gap between the inner and outer armrest substrates. A cover member extends over and is vertically supported by the fabric member.

In at least another aspect of the present invention, a vehicle armrest includes a fabric member having opposing fabric edges that extend across a gap defined between inner and outer armrest substrates that are molded around the opposing fabric edges, respectively. The opposing fabric edges are tensioned away from one another at a predetermined tension. A cover member extends over and is vertically supported by the fabric member.

In at least another aspect of the present invention, a method for forming a fabric substrate for a vehicular armrest includes the steps of disposing a fabric member within a mold for an armrest substrate, where the mold has inner and outer substrate-forming portions. The method also includes the step of tensioning the fabric member within the mold to a predetermined tension, the fabric member being tensioned between the inner and outer substrate-forming portions. A formable material is then disposed within inner and outer substrate-forming portions of the mold. The formable material at least partially surrounds a portion of the fabric member. The formable material and the fabric member form a unitary fabric-based armrest. The fabric member extends across a gap defined by an inner armrest substrate formed in the inner substrate forming portion and an outer armrest substrate formed within the outer substrate forming portion. The unitary fabric-based armrest substrate is then removed from the mold.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 23 is a cross-sectional view of a form for creating another alternate embodiment of the fabric substrate armrest showing the fabric member being tensioned within the mold before the formable material is disposed within the mold;

FIG. 24 is a cross-sectional view of the form of FIG. 20 for creating a fabric substrate armrest showing the portions of the form engaged in the formable material about to be disposed within the form to create the inner and outer armrest substrates of the fabric substrate armrest.

DETAILED DESCRIPTION OF THE PREFERRED EMBODIMENTS

Figure 1:
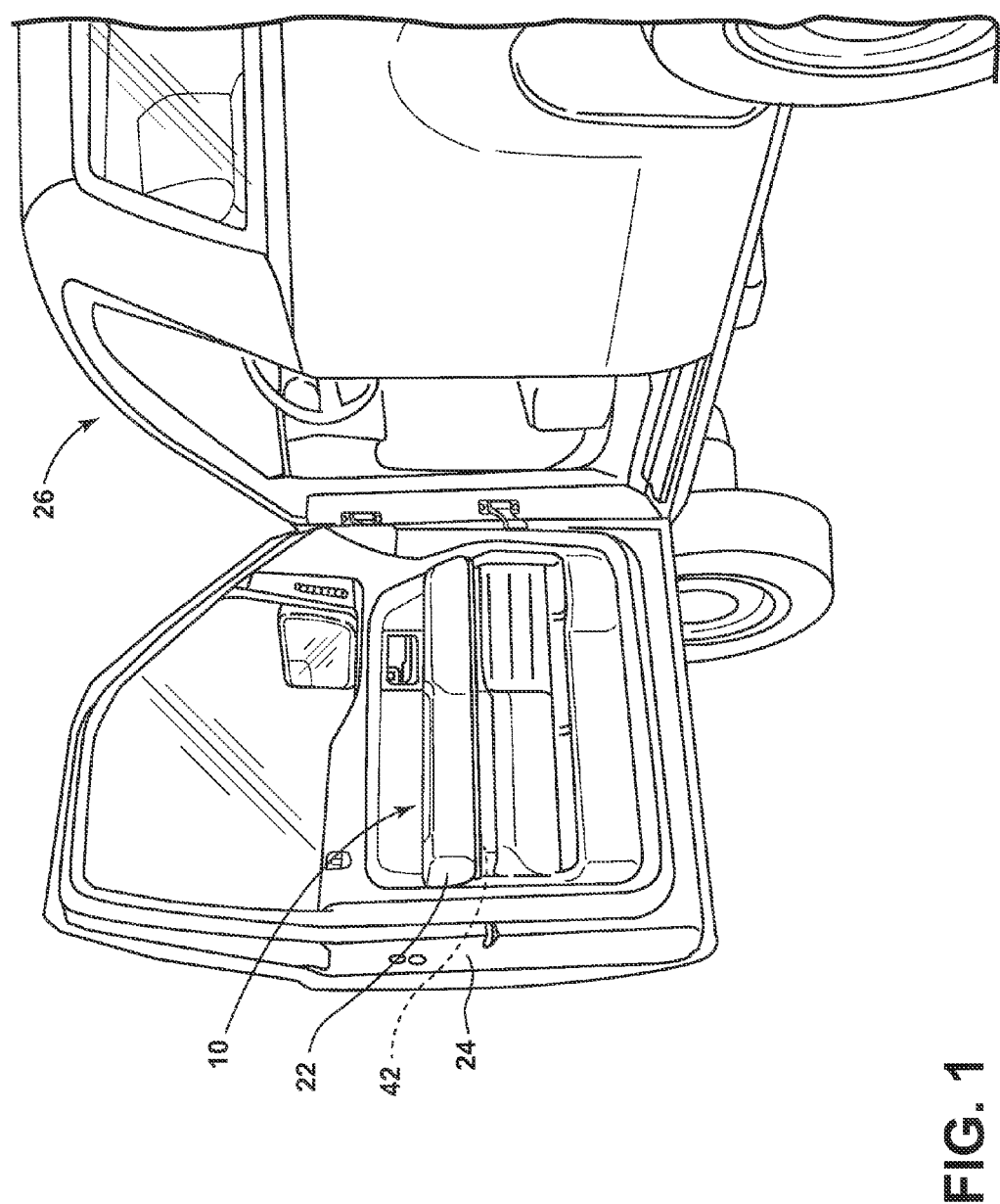
FIG. 1 is a rear side perspective view of a vehicle with a door in the open position and with an embodiment of the fabric substrate armrest installed.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a vehicular fabric substrate armrest including an inner armrest substrate 12 and having at least one buckling member 14 that extends to an outer armrest substrate 16. A gap 18 is defined by the inner and outer armrest substrates 12, 16 and the at least one buckling member 14. A fabric member 20 extends across the gap 18 and is attached to the inner and outer armrest substrates 12, 16. A cover member 22 extends over, and is vertically supported by, the fabric member 20.

Referring again to the embodiment of FIG. 1, the fabric substrate armrest 10 is installed within a door 24 of a vehicle 26 proximate the location of the occupant's elbow and arm to provide vertical support to the occupant's arm while in the vehicle 26. It is contemplated that the fabric substrate armrest 10 can also be disposed at the interior side panels of a vehicle 26 to provide arm support for occupants in seating locations that do not have a door 24 adjacent thereto. Such locations can include, but are not limited to, a rear seat in a two-door vehicle, a third-row seat in a four-door vehicle, a center console, and other similar locations.

Figure 2:
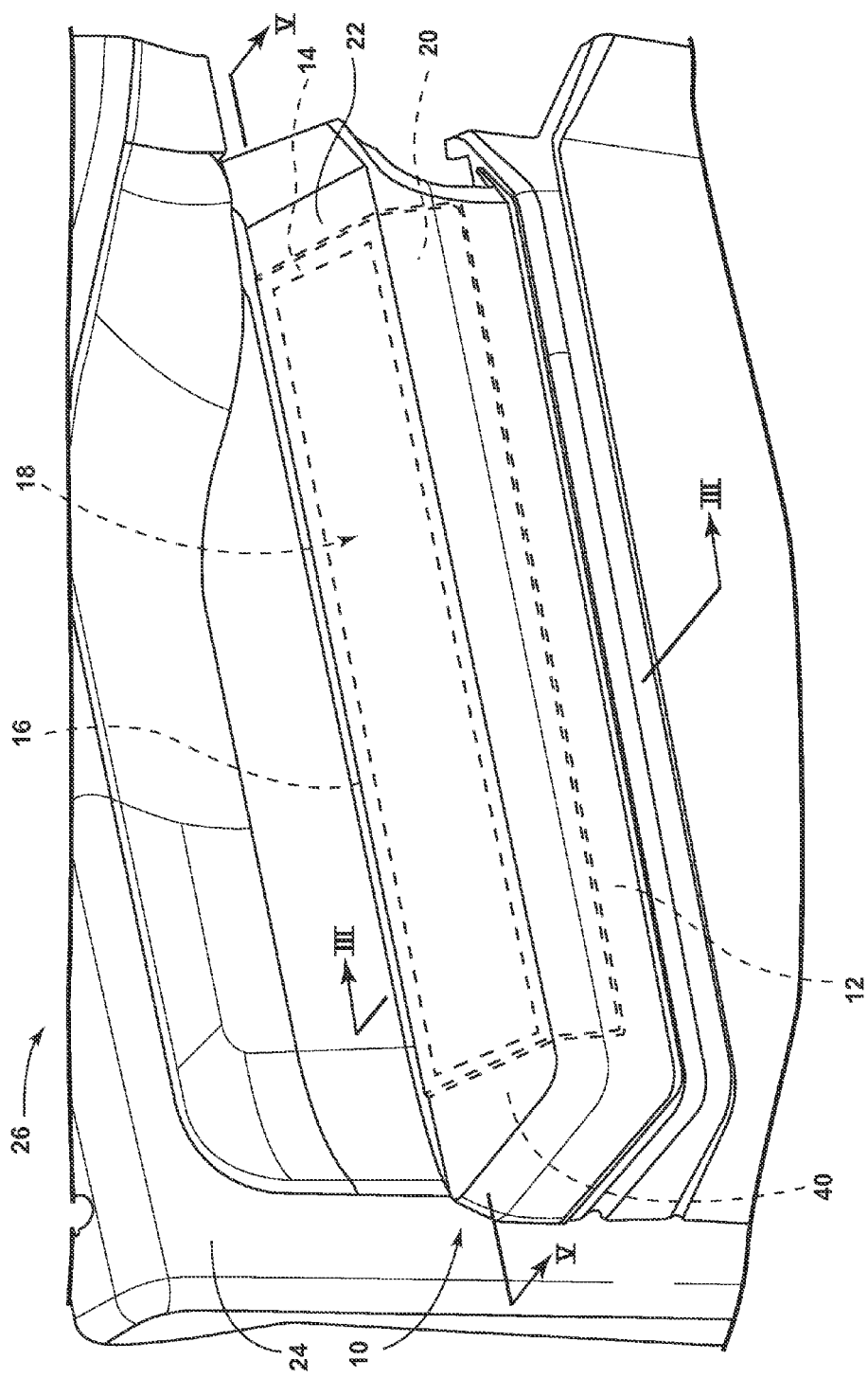
FIG. 2 is a top perspective view of one embodiment of the fabric substrate armrest.
Figure 3:
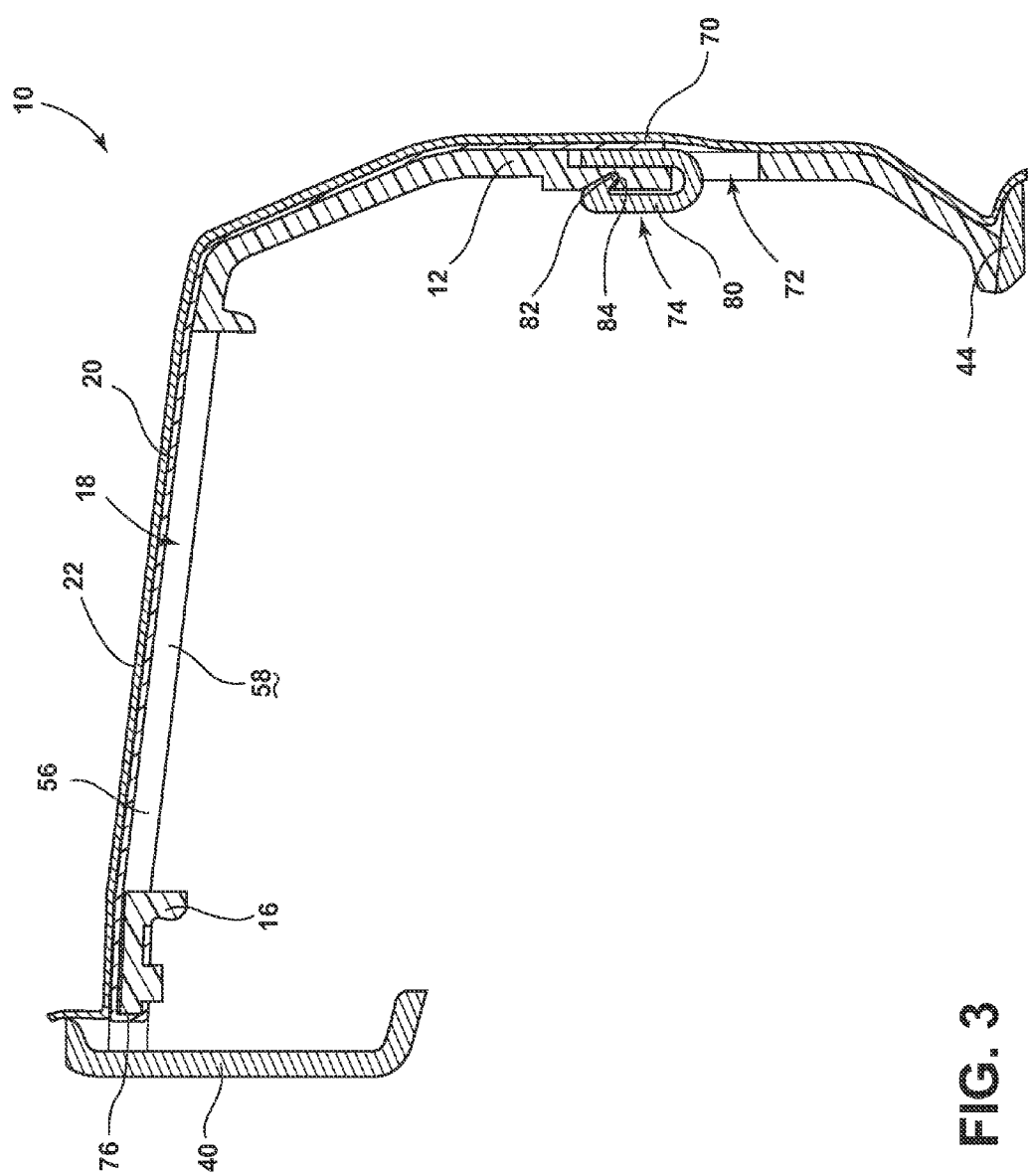
FIG. 3 is a cross-sectional view of the fabric substrate armrest of FIG. 2 taken at line III-III.
Figure 4:
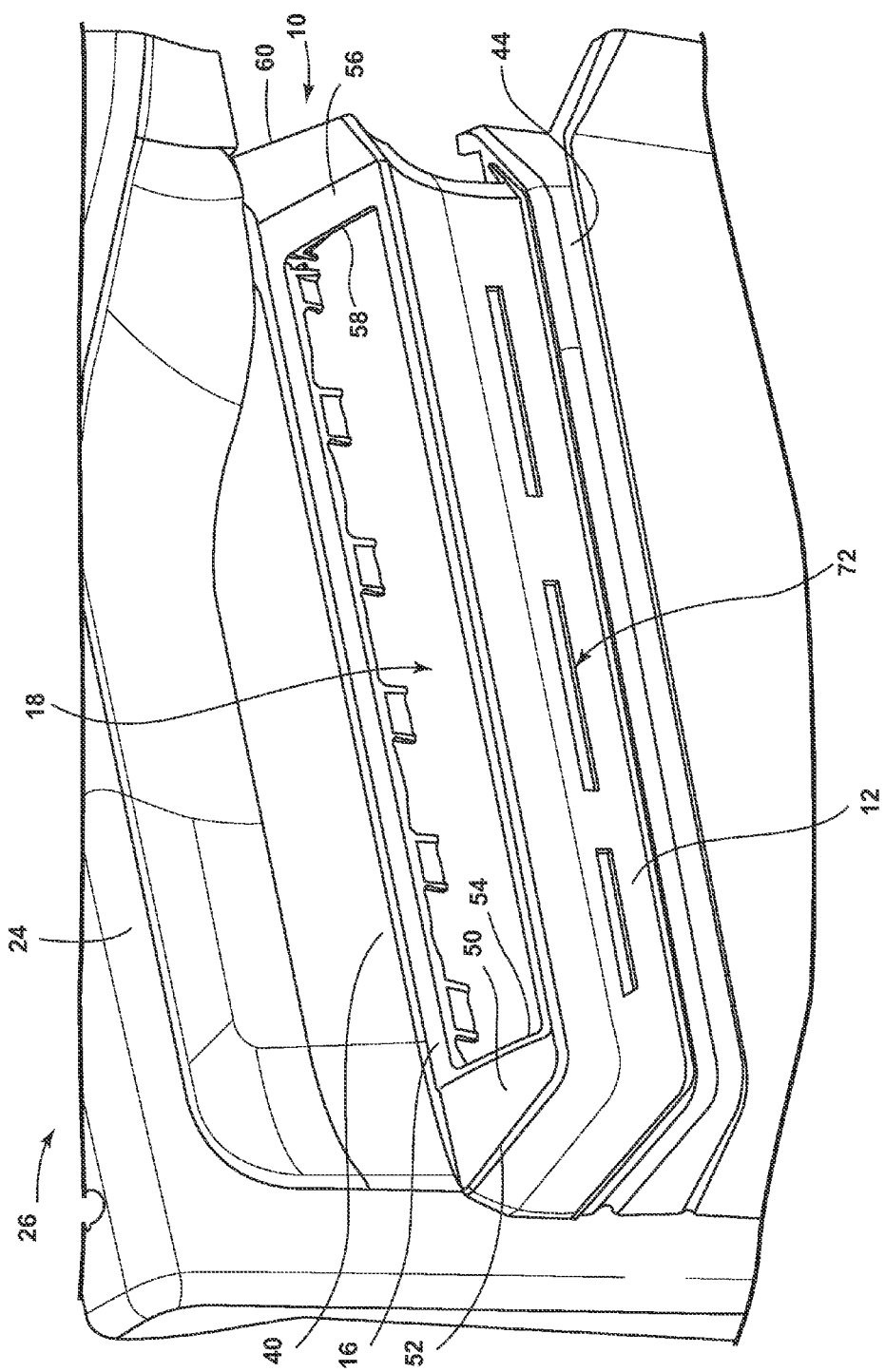
FIG. 4 is a partially exploded perspective view of the fabric substrate armrest of FIG. 2 with the cover and fabric member removed.
Figure 5:
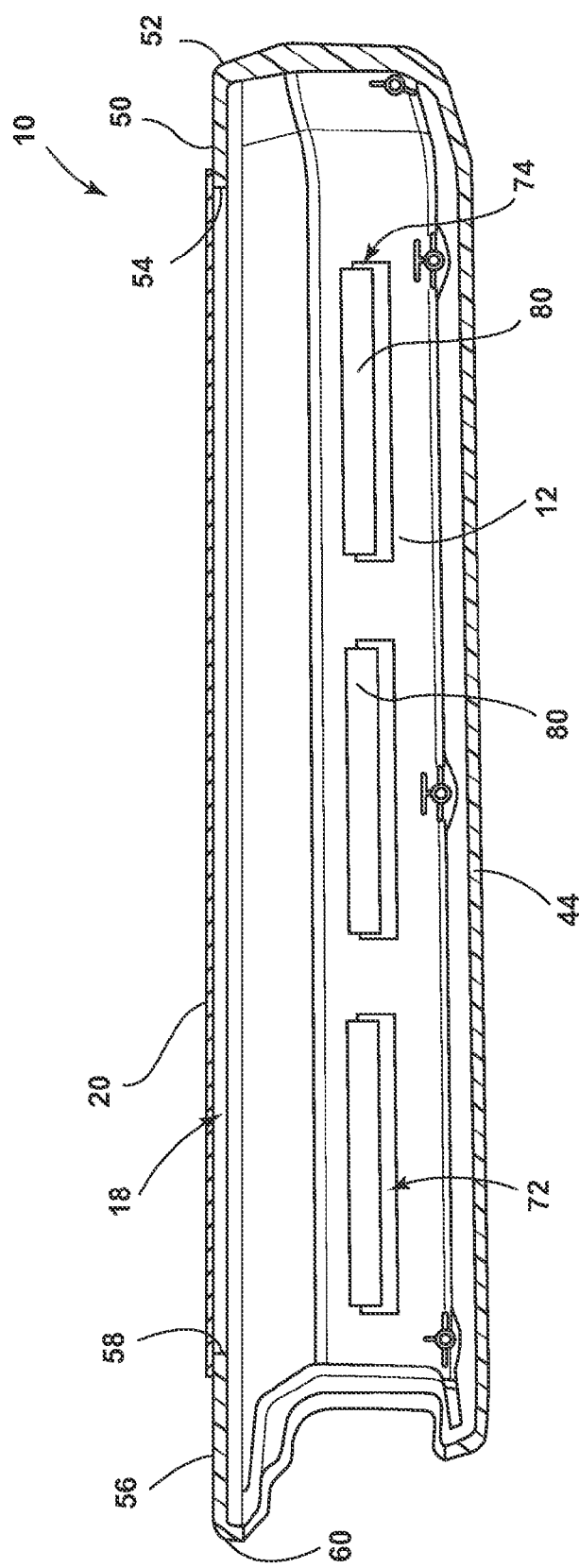
FIG. 5 is a cross-sectional view of the fabric substrate armrest of FIG. 2 taken at line V-V.

Referring again to the embodiment of FIGS. 2-4, the inner armrest substrate 12 is attached to a lower portion 44 of the door frame 42 and the outer armrest substrate 16 is attached to an upper portion 40 of the door frame 42. A first buckling member 50 extends along a front edge 52 of the armrest substrate, between the inner and outer armrest substrates 12, 16, wherein the first buckling member 50 defines a front boundary 54 of the gap 18 extending between the inner and outer armrest substrates 12, 16. A second buckling member 56 extends along a rear edge 60 of the armrest substrate, between the inner and outer armrest substrates 12, 16. The second buckling member 56 defines a rear boundary 58 of the gap 18 extending between the inner and outer armrest substrates 12, 16. The gap 18 is configured to extend substantially the length of the inner and outer armrest substrates 12, 16. The fabric member 20 attaches to the inner and outer armrest substrates 12, 16 and spans the gap 18 such that the fabric member 20 provides the primary vertical support for those portions of the fabric substrate armrest 10 disposed within the outer extent of the gap 18.

Referring now to the embodiment of FIGS. 3 and 4, a first edge 70 of the fabric member 20 is coupled to the inner armrest substrate 12, wherein the inner armrest substrate 12 includes at least one slot 72. The first edge 70 of the fabric member 20 includes a fastening member 74 that is configured to engage the slot 72 of the inner armrest substrate 12. A second edge 76 of the fabric member 20 is configured to attach to the outer armrest substrate 16, such that the fabric member 20 is tensioned across the gap 18 to vertically support the arm of an occupant at those portions defined within the outer extent of the gap 18.

As illustrated in the embodiment of FIGS. 2-5, the first edge 70 of the fabric member 20 can include a plurality of fastening members 74 that engage a corresponding plurality of slots 72 defined within the inner armrest substrate 12. The fastening member 74 can include a hook 80 that engages a corresponding slot 72. The fastening member 74 can also include an interference tab 82 that engages a cooperative tab 84 proximate the slot 72 to substantially couple the first edge 70 of the fabric member 20 to the inner armrest substrate 12. In various embodiments, the inner armrest substrate 12 can include a single slot 72 that is configured to receive a plurality of fastening members 74 from the first edge 70 of the fabric member 20. Alternatively, the fabric member 20 can include a single fastening member 74 that couples with a single slot 72 of the inner armrest substrate 12. It is also contemplated that the corresponding slots 72 and fastening members 74 described above can be disposed on the outer armrest substrate 16 and the second edge 76 of the fabric member 20. It is further contemplated that the first and second edges 70, 76 of the fabric member 20 can each include fastening members 74 that engage cooperating slots 72 defined within each of the inner and outer armrest substrates 12, 16.

In various embodiments, the fabric member 20 can be made of various flexible fabric materials that can include, but are not limited to, cotton, fabric, plastic, vinyl, metallic fabric, wire mesh, and other substantially fabric-type materials that can be disposed upon and formed around the inner and outer armrest substrates 12, 16. Additionally, in various embodiments, the fabric member 20 can be a Class A flame-retardant fabric. It is contemplated that, in various embodiments, the fabric member 20 can be at least partially elastic so that the fabric member 20, when tensioned across the gap 18, can at least partially stretch to afford the user of the vehicle 26 comfort when resting an arm upon the fabric substrate armrest 10. In the embodiments described above, the tensioning force placed upon the fabric member 20 that extends between the inner and outer armrest substrates 12, 16 is configured to provide a location on which the occupant can rest their arm for comfort while within the vehicle 26. The combination of the cover member 22 and the fabric member 20 is configured to provide at least some vertical displacement when the occupant places their arm upon the fabric substrate armrest 10. In such an embodiment, the cover member 22 and the fabric member 20 provide a cushioned surface to the occupant. In other embodiments, as will be described more fully below, various cushioning members can be added to the armrest substrate to provide additional padding for the occupant using the fabric substrate armrest 10.

In the various embodiments, the cover member 22 can be made of a variety of materials that can include, but are not limited to, leather, PVC, TPO, plastic, vinyl, combinations thereof, or other similar materials. The cover member 22 is configured to extend over the inner and outer armrest substrates 12, 16, the buckling members 14 and the fabric member 20. It is contemplated that the cover member 22 can be tensioned over the fabric substrate armrest 10, or can be fastened or adhered thereto.

As illustrated in the embodiment of FIG. 4, the first and second buckling members 50, 56 can define portions of the fabric substrate armrest 10, wherein the fabric substrate armrest 10 includes the inner and outer armrest substrates 12, 16 and the buckling members 14 that extend therebetween. Alternatively, first and second buckling members 50, 56 can be separate members that are attached to either the inner armrest substrate 12, the outer armrest substrate 16, or both. It is contemplated that in various embodiments, the buckling members 14 can be part of a fabric member frame that extends around and receives at least a portion of the fabric member 20. In such an embodiment, the fabric member frame is coupled to the inner and outer armrest substrates 12, 16.

Figure 12:
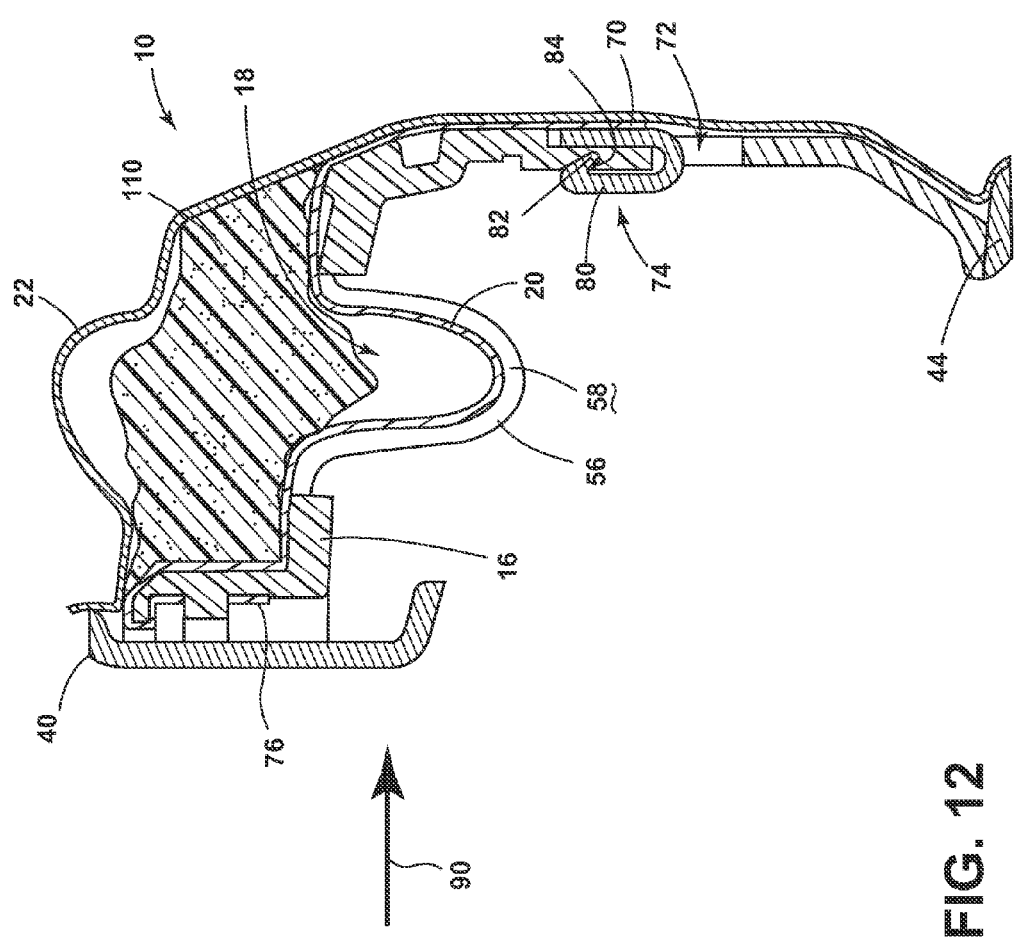
FIG. 12 is the cross-sectional view of the fabric substrate armrest of FIG. 10 with a side impact force applied to the armrest.

As illustrated in the embodiment of FIG. 12, the first and second buckling members 50, 56 define weakened portions of the fabric substrate armrest 10, such that lateral forces 90 disposed upon the fabric substrate armrest 10, such as in a side collision event, cause the first and second buckling members 50, 56 to bend or deflect to absorb at least a portion of the lateral force 90 applied to the fabric substrate armrest 10. The fabric member 20, being substantially flexible, provides minimal lateral support, if any, to the fabric substrate armrest 10 in the area of the gap 18 between the first and second buckling members 50, 56. In this manner, the fabric member 20 can provide vertical support at those portions of the armrest 10 used by the occupant, while also providing little, if any, lateral structure to the fabric substrate armrest 10, such that the first and second buckling members 50, 56 can deflect in a collision situation. The deflection of the first and second buckling members 50, 56 serves to minimize the distance that the fabric substrate armrest 10 projects into the cabin of the vehicle 26 as a result of the lateral force 90. In various embodiments, to allow the buckling members 14 to deflect when lateral forces 90 are applied, the first and second buckling members 50, 56 are configured to be weaker than the inner and outer armrest substrates 12, 16 in, at least, the lateral direction. This weakened condition can be accomplished by making the first and second buckling members 50, 56 from a separate and weaker material than the inner and outer armrest substrates 12, 16. The weakened condition can also be achieved by making the first and second buckling members 50, 56 to have a thinner cross-sectional area. Other configurations can include, but are not limited by, weakening notches or cutouts defined within the first and second buckling members 50, 56, scoring or thinned portions that define weaker areas of the first and second buckling members 50, 56 and other configurations.

In various embodiments, the armrest substrate, including the inner and outer armrest substrates 12, 16, and the buckling members 14, can be made of various materials that can include, but are not limited to, metal, plastic, composite, combinations thereof, as well as other substantially rigid materials. As discussed above, the inner and outer armrest substrates 12, 16 and the various buckling members 14 can be made of different materials, such that the buckling members 14 are configured to bend or deflect as a result of lateral forces 90, before bending or deflection occurs within the inner and outer armrest substrates 12, 16. It is also contemplated that the various buckling members 14 can include a plurality of buckling members 14 that extend between the inner and outer armrest substrates 12, 16 to define a plurality of gaps 18 extending between the inner and outer armrest substrates 12, 16.

Figure 6:
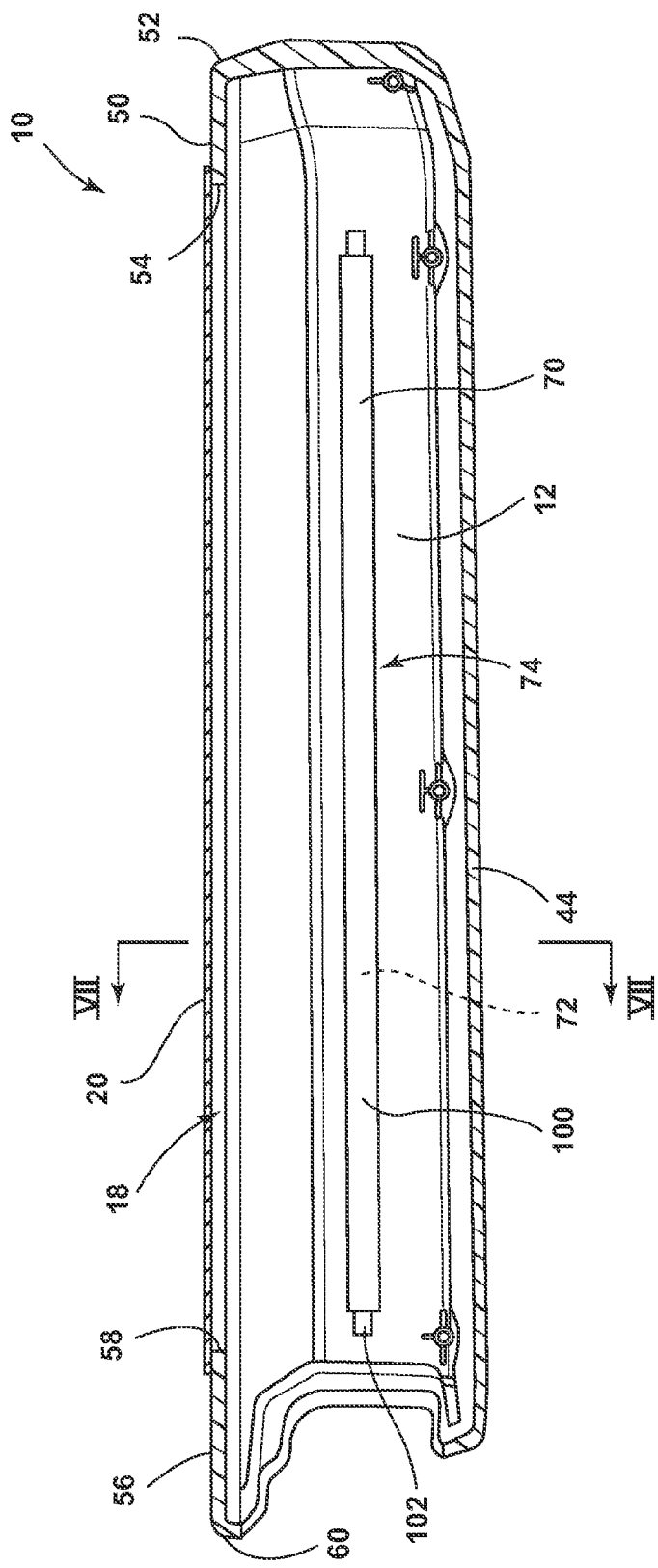
FIG. 6 is an alternate cross-sectional view of the fabric substrate armrest of FIG. 5 showing an alternate fastening member.
Figure 7:
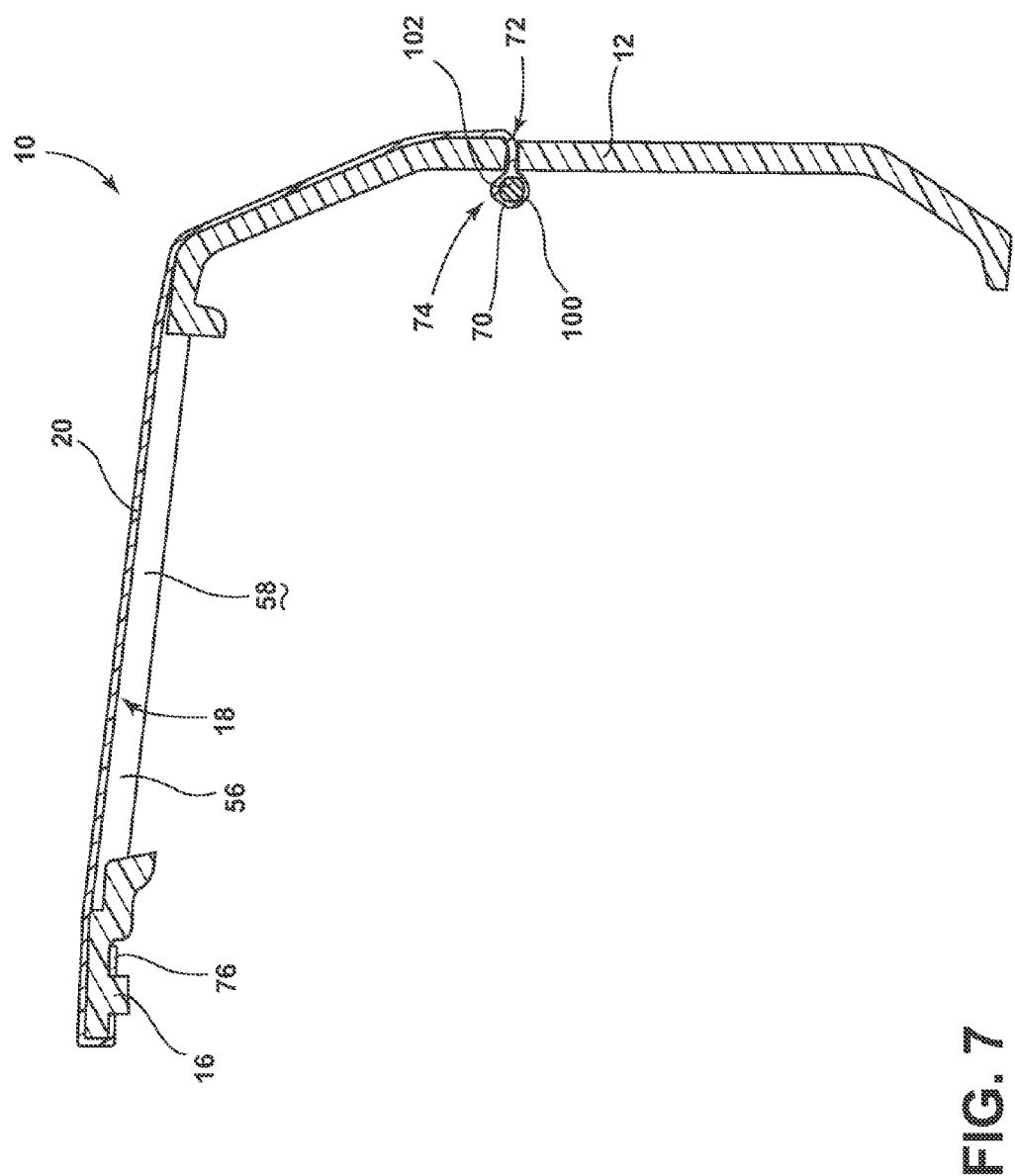
FIG. 7 is a cross-sectional view of the fabric substrate armrest of FIG. 6 taken at line VII-VII.
Figure 8:
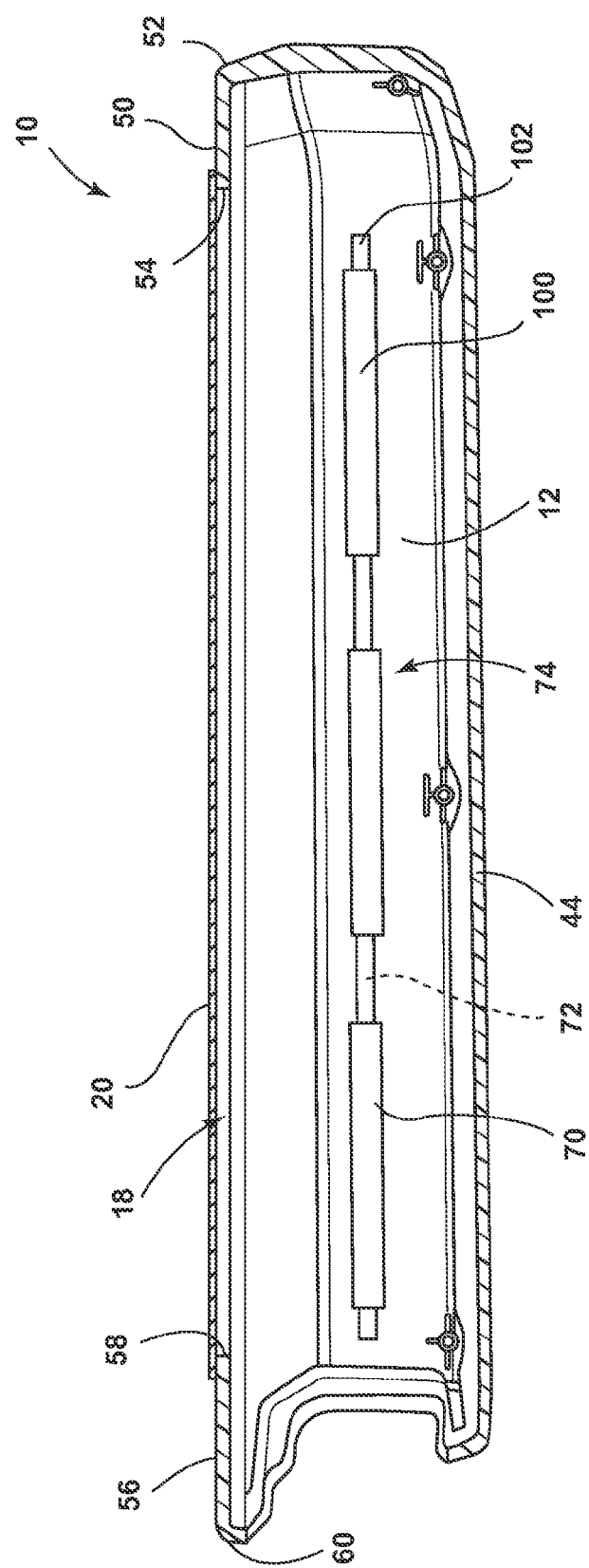
FIG. 8 is an alternate cross-sectional view of the fabric substrate armrest of FIG. 6 with an alternate slot configuration.
Figure 9:
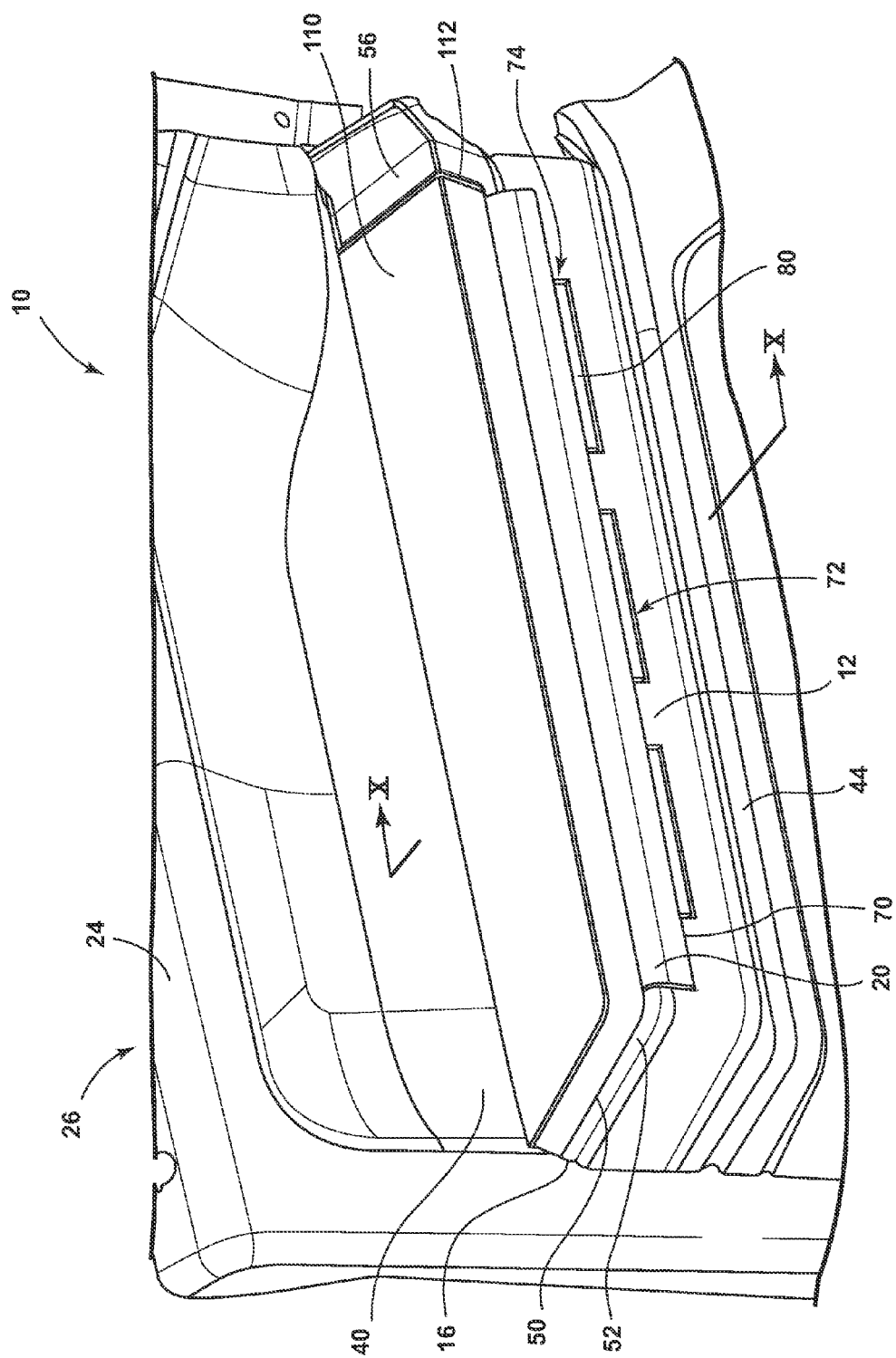
FIG. 9 is a top perspective view of another embodiment of the fabric substrate armrest.

Referring now to the embodiments illustrated in FIGS. 6-8, the first edge 70 of the fabric member 20 can include one or more looped features 100 or similar apertures that can be disposed through the one or more slots 72 of the inner armrest substrate 12. Once inserted through the slot 72, a retaining bar 102 can be slidably engaged through the looped features 100 such that the combination of the retaining bar 102 and looped features 100 are prevented from being pulled back through the slot 72 of the inner armrest substrate 12. This retention configuration creates the tension upon the fabric member 20 across the gap 18. It is contemplated that, as with the embodiments discussed above, the inner armrest substrate 12 can include a single slot 72 that is configured to receive a plurality of looped features 100 that receive a sliding member and couple the first edge 70 of the fabric member 20 to the inner armrest substrate 12. Alternatively, the first edge 70 of the fabric member 20 can include a single elongated loop feature that extends substantially the length of the first edge 70 of the fabric member 20, wherein the single looped feature 100 is disposed through a single slot 72 defined within the inner armrest substrate 12. As with the embodiments discussed above, the second edge 76 of the fabric member 20 can include one or more looped features 100 as discussed above that engage corresponding slots 72 that are defined within the outer armrest substrate 16. It is further contemplated that the first and second edges 70, 76 of the fabric member 20 can each include the looped features 100 and both the inner and the outer armrest substrates 12, 16 can include the slots 72 that cooperate with the looped features 100 of the fabric member 20.

In various embodiments, the fabric member 20 can be attached to the inner and outer armrest substrates 12, 16 through methods apart from and/or in addition to those methods described above. Such methods can include, but are not limited to, mechanical-type fasteners, interference-type fasteners, adhesives, welding, staples, tensioning mechanisms, and other similar attachment methods. Additionally, these attachment methods may be used to couple the fabric member 20 to a fabric frame that surrounds the fabric member 20. In such an embodiment, when the fabric member 20 is attached to the fabric frame, the fabric member 20 is tensioned within the frame and the frame is attached to the inner and outer armrest substrates 12, 16.

Referring now to the embodiment shown in FIGS. 9-12, the fabric substrate armrest 10 can include a cushion member 110 that is disposed upon, and is vertically supported by, the tensioned fabric member 20. The cushion member 110 and the fabric member 20 can be covered by the cover member 22. The inner and outer armrest substrates 12, 16 can include a recessed portion 112 that is configured to receive at least a portion of the cushion member 110, such that the fabric substrate armrest 10 has a substantially level top surface for supporting the occupant's arm. It is contemplated that the cushion member 110 can be partially supported by the inner and outer armrest substrates 12, 16 and the buckling members 14 at the perimeter of the cushion member 110. In the various embodiments, it is contemplated that the primary vertical support for the cushion member 110 at the gap 18 is from the fabric member 20 that is tensioned across the gap 18.

Figure 10:
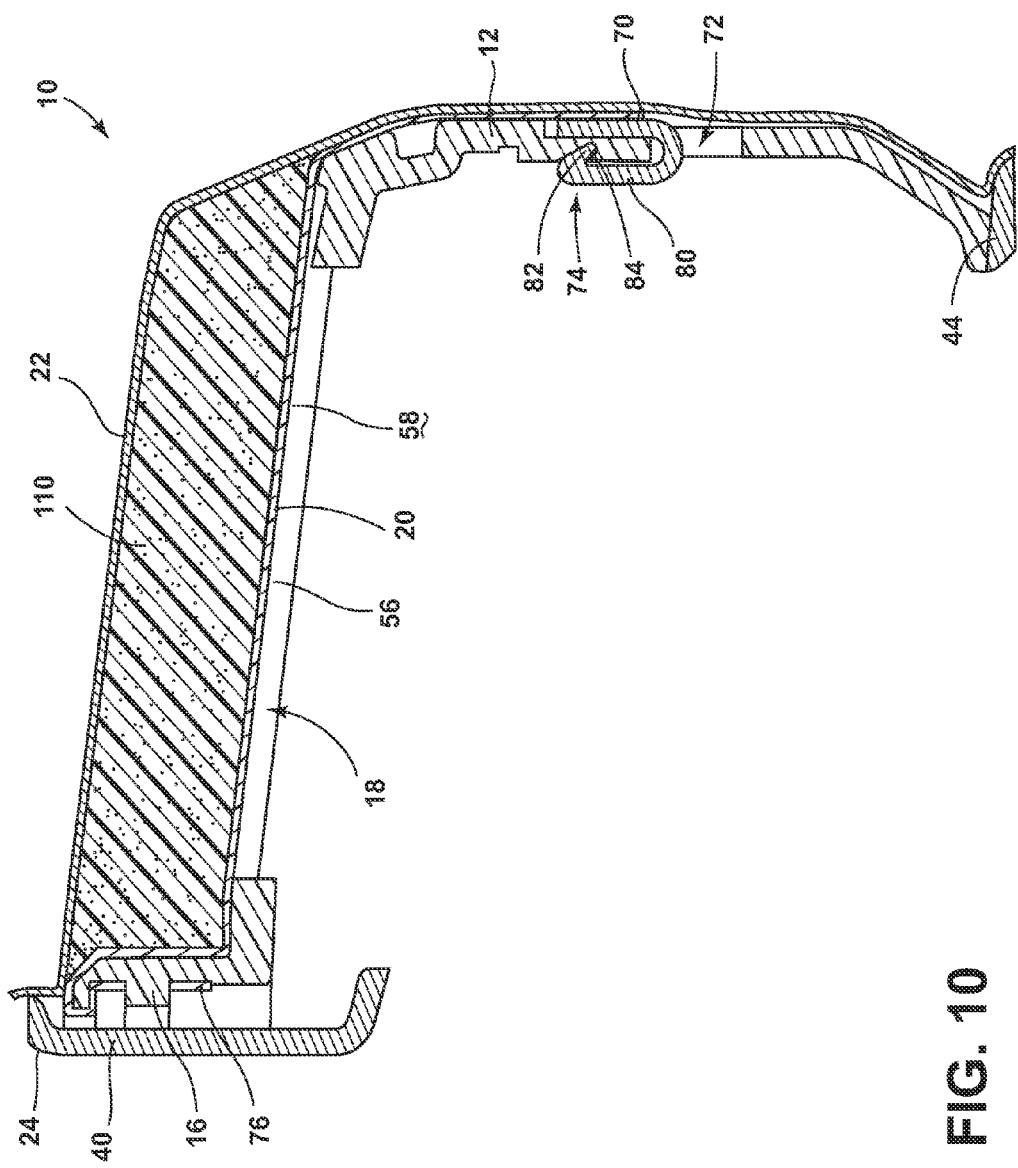
FIG. 10 is a cross-sectional view of the fabric substrate armrest of FIG. 9 taken at line X-X.
Figure 11:
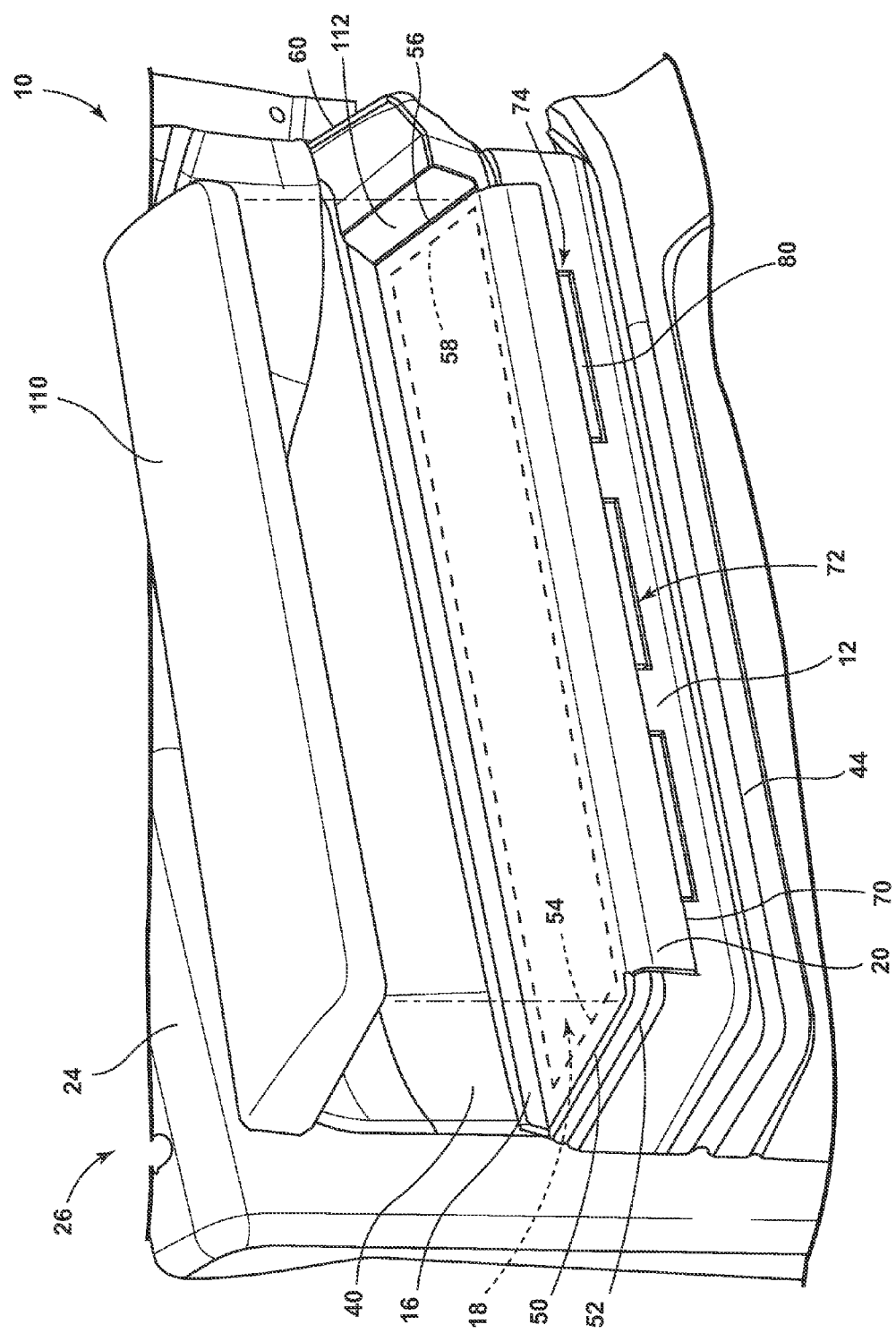
FIG. 11 is a partially exploded top perspective view of the fabric substrate armrest of FIG. 9 with the cover and cushion member removed.

Referring now to the embodiment of FIGS. 10 and 12, embodiments of the fabric substrate armrest 10 that include a cushion member 110 operate substantially similar to those embodiments that have no cushion member 110, as described above. Where a lateral force 90 is applied to the fabric substrate armrest 10, such as from a side impact, the first and second buckling members 50, 56, being weakened portions of the fabric substrate armrest 10, are configured to buckle before the inner and outer armrest substrates 12, 16, such that the outer armrest substrate 16 can move toward the inner armrest substrate 12 to absorb the lateral forces 90 from the impact. In this manner, the inner armrest substrate 12 experiences a lesser lateral displacement toward the inner portions of the cabin as a result of the deflection of the first and second buckling members 50, 56 and the movement of the outer armrest substrate 16 toward the inner armrest substrate 12. This configuration also can slow the velocity that the inner armrest substrate 12 can move inward toward the cabin area due to the first and second buckling members 50, 56 absorbing a portion of the lateral force 90. This configuration allows the outer armrest substrate 16 to experience a greater lateral displacement than the inner armrest substrate 12. The cushion member 110 in the above-described embodiment provides minimal, if any, lateral structure that might serve to bolster the first and second buckling members 50, 56 that span the gap 18 between the inner and outer armrest substrates 12, 16. In this manner, the cushion member 110 experiences substantially the same amount of deflection or compression as the first and second buckling members 50, 56, without adding lateral structural support at the gap 18 of the fabric substrate armrest 10.

Figure 13:
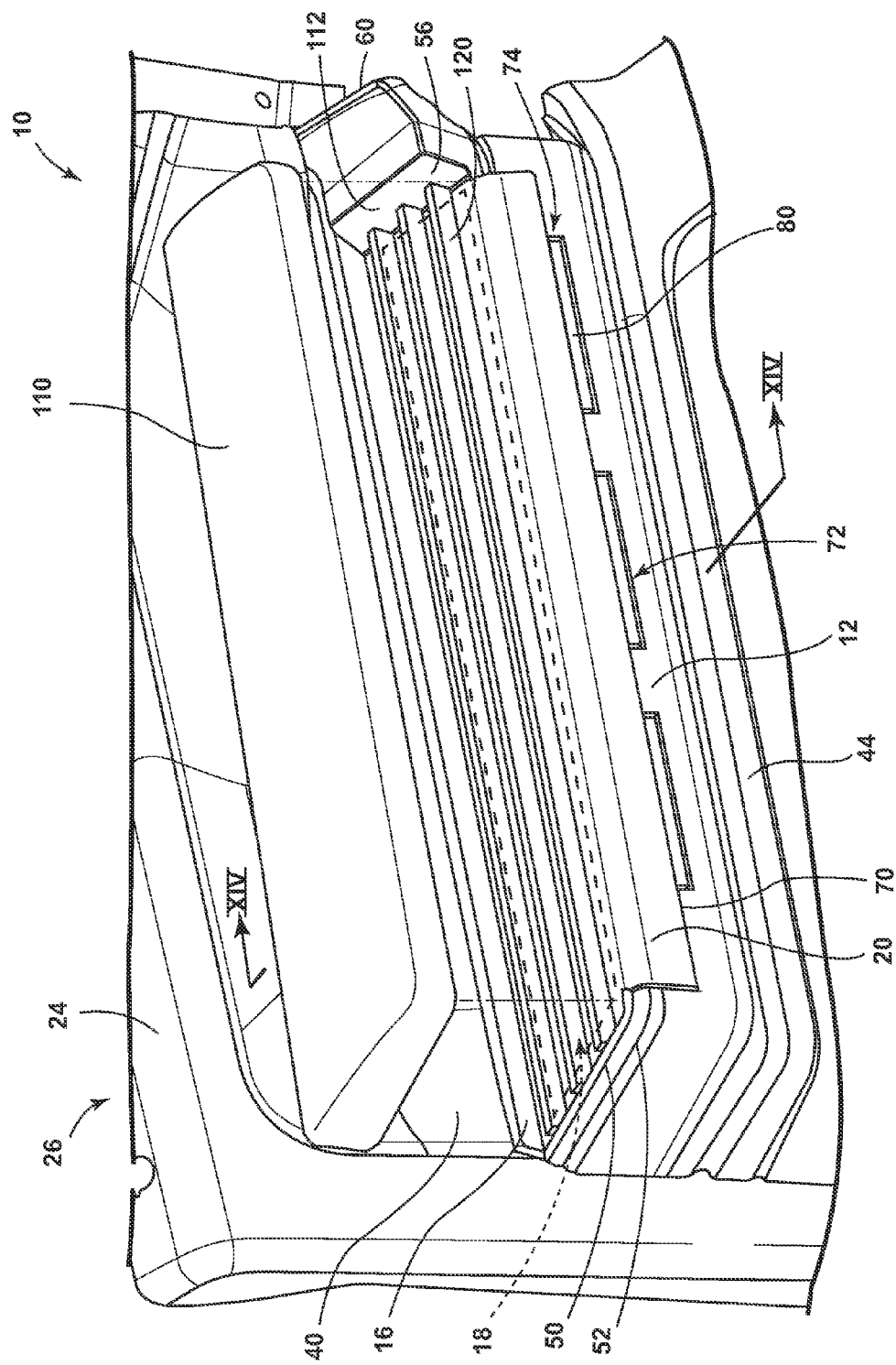
FIG. 13 is a partially exploded top perspective view of another embodiment of the fabric substrate armrest with the cover and the cushion member removed.
Figure 14:
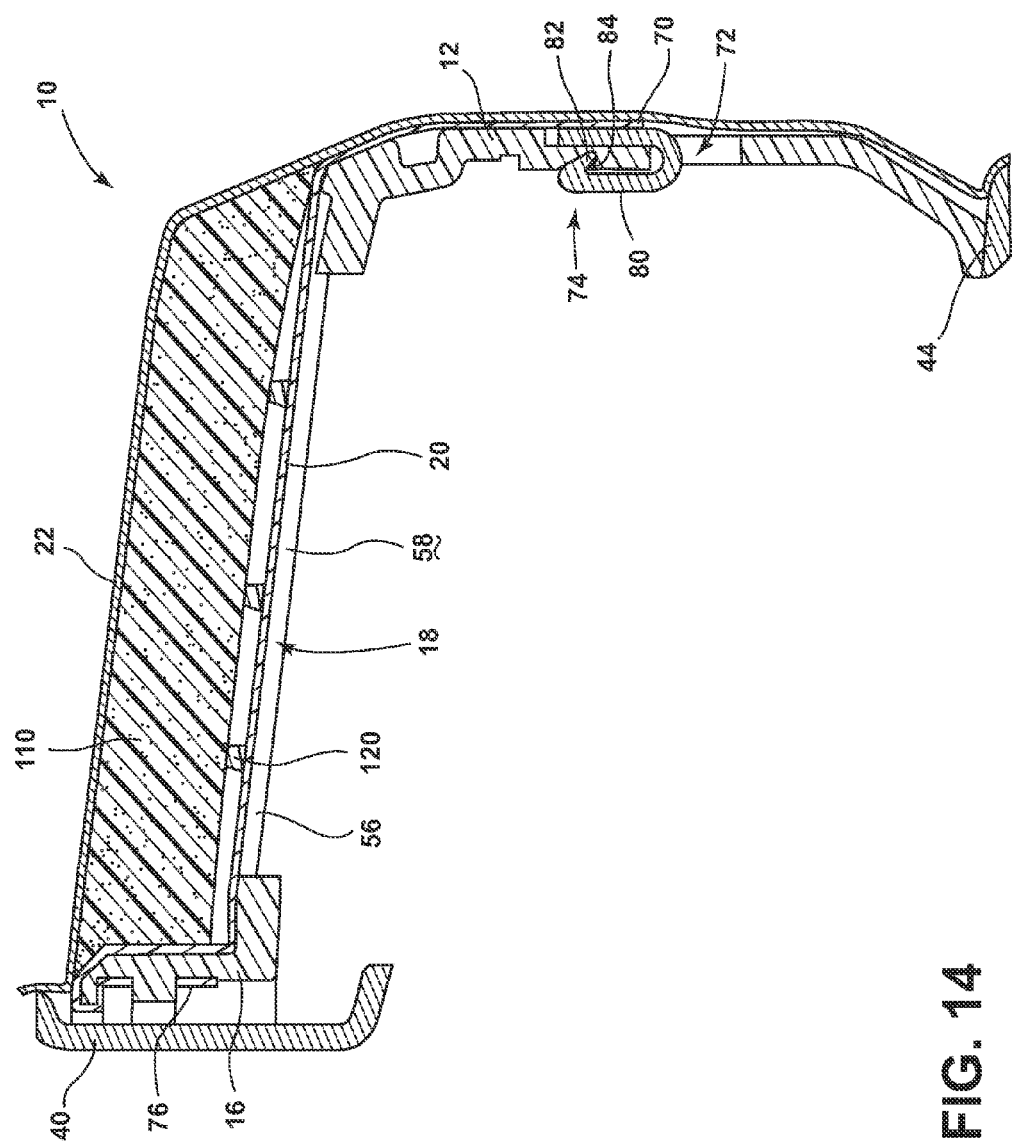
FIG. 14 is a cross-sectional view of the fabric substrate armrest of FIG. 13, taken at line XIV-XIV.
Figure 15:
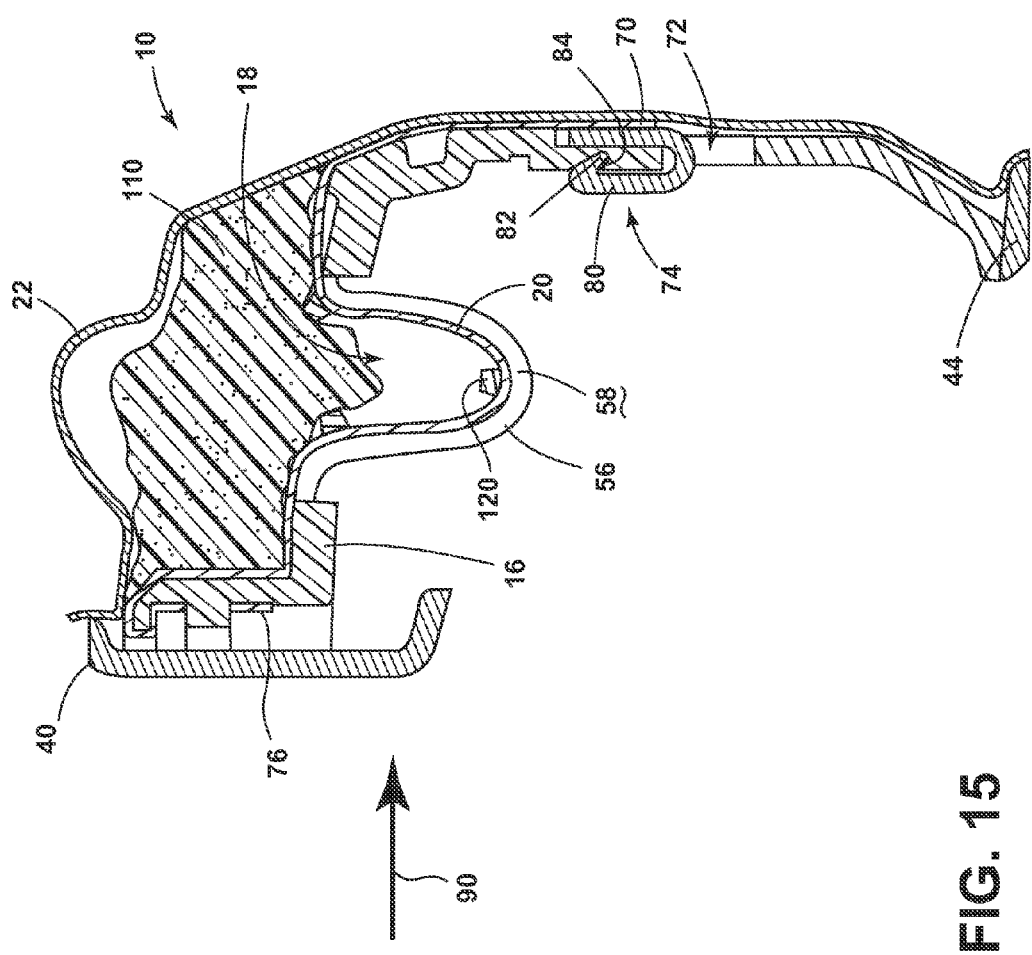
FIG. 15 is a cross-sectional view of the fabric substrate armrest of FIG. 14 with a side impact load applied to the armrest.
Figure 16:
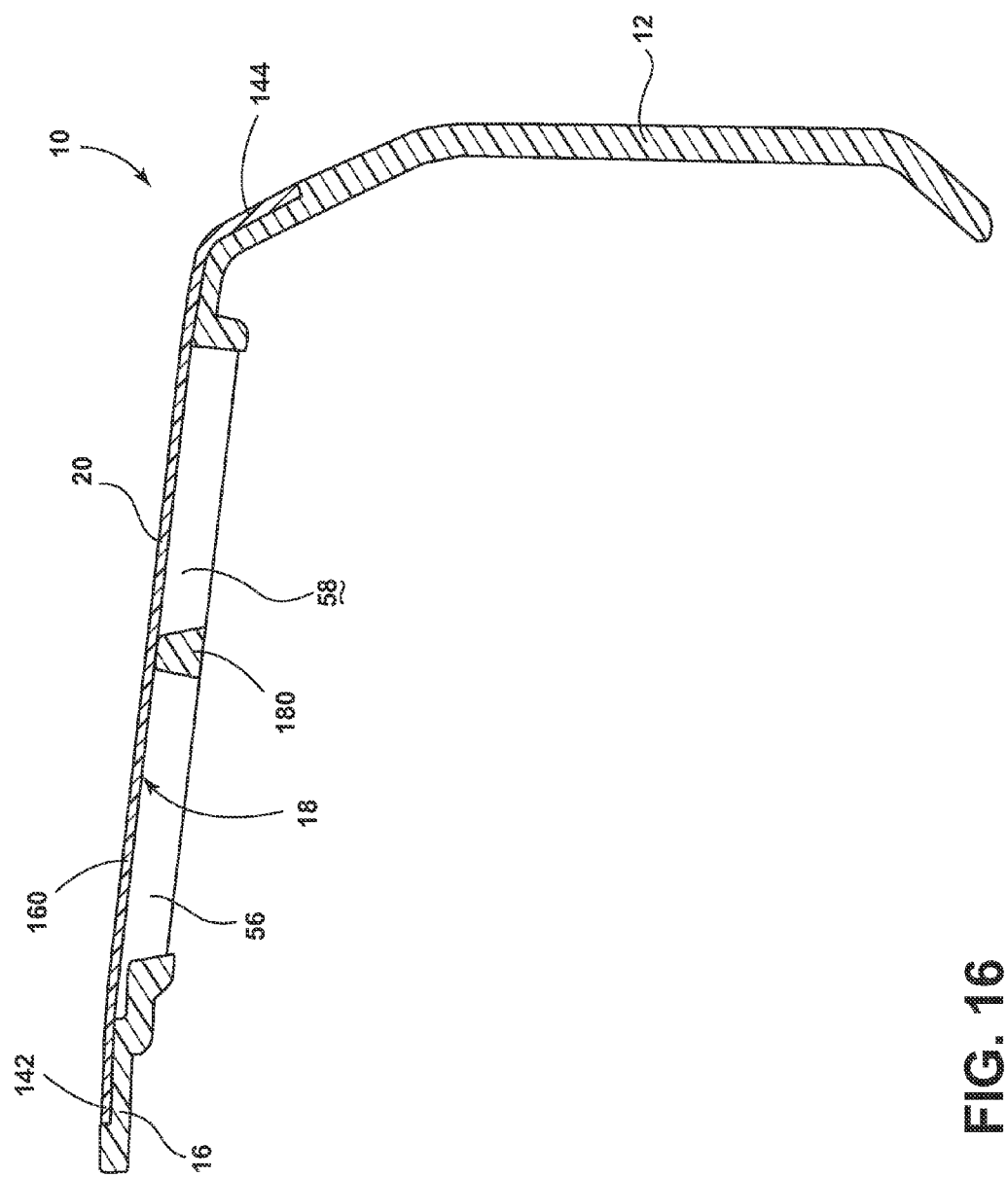
FIG. 16 is a cross-sectional view of an alternate embodiment of the fabric substrate armrest with the fabric member molded into portions of the inner and outer armrest substrates.
Figure 17:
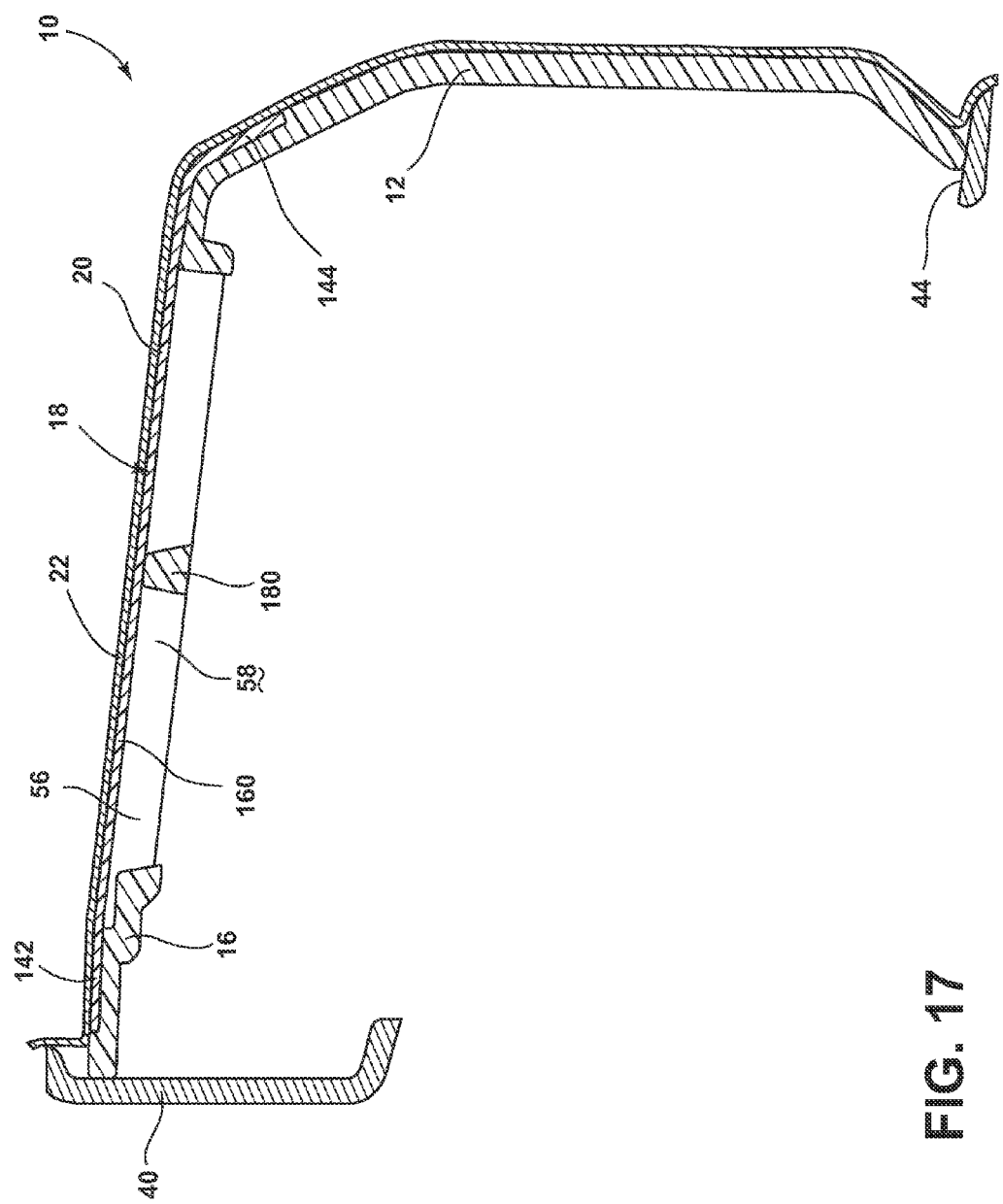
FIG. 17 is a cross-sectional view of the fabric substrate armrest of FIG. 16 installed within the structure of a vehicle and a cover member extending over the top surface of the fabric substrate armrest.

Referring now to the embodiment illustrated in FIGS. 13-15, one or more lateral bars 120 can be disposed across the gap 18 between the first and second buckling members 50, 56 to provide additional vertical support to the cushion member 110 and the occupant's arm. The lateral bars 120 are configured to be free of engagement with either of the inner or outer armrest substrates 12, 16, such that the lateral bars 120 provide an under-cushion vertical support, but do not provide additional lateral support across the gap 18 between the inner and outer armrest substrates 12, 16. The lateral bars 120 are shown a being oriented perpendicular with the first and second buckling members 50, 56. It is contemplated that, in various embodiments, the lateral bars 120 can be oriented in other non-perpendicular configurations, so long as the lateral bars 120 do not inhibit the deflection of the first and second buckling members 50, 56. The lateral bars 120 can be made of various substantially rigid materials that include, but are not limited to, plastic, metal, composite, PVC, and other rigid-type materials.

In various embodiments, the lateral bars 120 can be placed upon the buckling members 14 or can be placed upon tabs or notches of the first and second buckling members 50, 56, such that the lateral bars 120 do not provide additional lateral structure along the length of the first and second buckling members 50, 56 that might inhibit the deflection of the first and second buckling members 50, 56 when the lateral forces 90 are applied to the fabric substrate armrest 10. In this manner, the lateral bars 120 are configured to move and be displaced by the deflective movement of the first and second buckling members 50, 56 when lateral forces 90 are applied to the fabric substrate armrest 10. Accordingly, the lateral bars 120 and the fabric member 20 provide vertical support to the cushion member 110 without substantially adding to the lateral strength of the fabric substrate armrest 10 at the gap 18 and the first and second buckling members 50, 56. In various embodiments, the fabric member 20 can be placed over the lateral bars 120, or, the fabric member 20 can be placed through apertures in the lateral bars 120, wherein the tensioning force of the fabric member 20 being stretched across the gap 18 substantially holds the lateral bars 120 in place. In this manner, the lateral bars 120 can be minimally engaged with the first and second buckling members 50, 56. The lateral bars 120 can also be attached to the fabric frame member, as described above, where the fabric frame member includes the buckling members 14, and is attached to the inner and outer armrest substrates 12, 16.

In various embodiments, it is contemplated that the cover member 22 can include a cushioned portion, such that the cushioned portion of the cover member 22 is disposed at the gap 18 of the fabric substrate armrest 10, wherein the cushioned portion of the cover is supported by the first and second buckling members 50, 56. Additionally, in various embodiments, the fabric substrate armrest 10 can include a handle that can be used to open and close the door 24 to which the fabric substrate armrest 10 is attached. The fabric substrate armrest 10 can also include various cup holders, containers, and other storage areas. It is contemplated that the handle and storage areas included in the fabric substrate armrest 10 do not substantially add lateral support to the first and second buckling members 50, 56.

Referring now to the various embodiments illustrated in FIGS. 16-22, the vehicular fabric substrate armrest 10, according to another embodiment, can be formed by the fabric member 20 being tensioned across the gap 18 defined between the inner and outer armrest substrates 12, 16, wherein the inner and outer armrest substrates 12, 16 are formed around at least a portion of the fabric member 20. At least one of the buckling members 14 extends across the gap 18 between the inner and outer armrest substrates 12, 16. The cover member 22 extends over and is vertically supported by the fabric member 20 of the vehicular fabric substrate armrest 10. Within the various embodiments, it is contemplated that the fabric member 20 can be tensioned between the inner and outer armrest substrates 12, 16 at a predetermined tension 140. The predetermined tension 140, according to the various embodiments, can be determined during the design phase of the vehicle 26 to derive the parameters necessary for the structural integrity of the particular fabric substrate armrest 10 for the door 24 of the vehicle 26. Accordingly, the fabric member 20 of the fabric substrate armrest 10 can include opposing first and second fabric edges 142, 144 that extend across the gap 18 that is defined between the inner and outer armrest substrates 12, 16, wherein the inner and outer armrest substrates 12, 16 are molded around the opposing first and second fabric edges 142, 144, respectively, of the fabric member 20. In this manner, the opposing first and second fabric edges 142, 144 are tensioned away from one another at the predetermined tension 140.

Referring again to the embodiment illustrated in FIGS. 16-19, the fabric member 20 of the fabric substrate armrest 10 can include at least one layer of reinforcement tape 160, where each layer of reinforcement tape 160 includes a primary axis 162. Typically, the primary axis 162 is defined by a tension-resisting direction of the reinforcement tape 160 along which the various tension-resisting fibers 164 of the reinforcement tape 160 are directed. Accordingly, the reinforcement tape 160 can have a greater ability to resist tension along the direction of the primary axis 162 of the particular reinforcement tape 160. It is contemplated that the various tension-resisting fibers 164 can be woven together.

Figure 18:
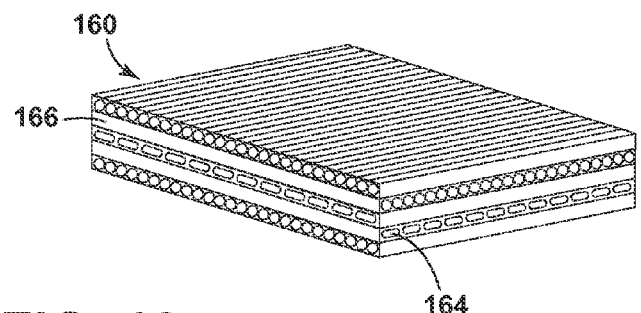
FIG. 18 is a top perspective cross-sectional view of one embodiment of the reinforcement tape of the fabric member having a plurality of layers.
Figure 19:
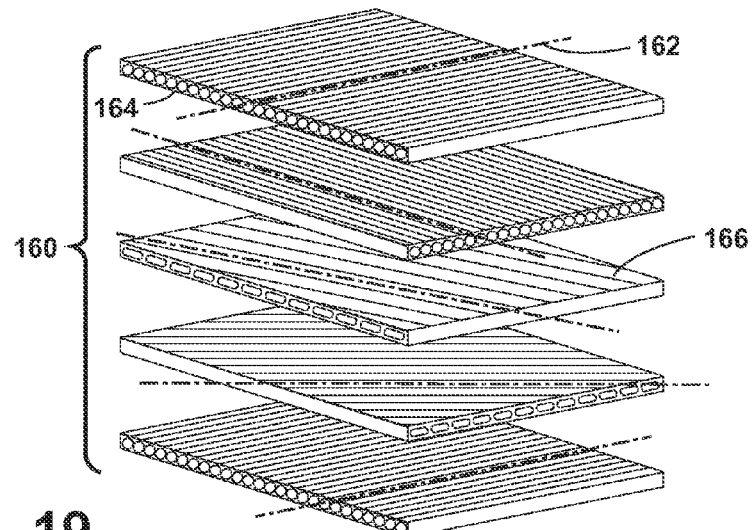
FIG. 19 is an exploded perspective view of an alternate embodiment of the reinforcement tape of the fabric member having a plurality of layers.

As illustrated in FIGS. 18-19, it is also contemplated that the fabric member 20 can include a plurality of layers 166 within the reinforcement tape 160, where each layer of reinforcement tape 160 includes its own primary axis 162 along which the various tension-resisting fibers 164 of the individual layers 166 of reinforcement tape 160 are aligned. Where multiple layers 166 of reinforcement tape 160 are used to create the fabric member 20, the various layers 166 can be positioned such that the various primary axes 162 of the layers 166 of reinforcement tape 160 are disposed in at least two different angular directions within the fabric member 20. Accordingly, the fabric member 20 can be constructed through layering, weaving or other fabric constructing method, such that it is configured to resist tension along the two different angular directions in which the primary axes 162 of the reinforcement tape 160 are aligned. It is contemplated that the various layers 166 of reinforcement tape 160 that make up the fabric member 20 can be disposed in three or more directions as well, such that the various layers 166 of reinforcement tape 160 allow the fabric member 20 to resist tension in a corresponding number of directions.

Figure 20:
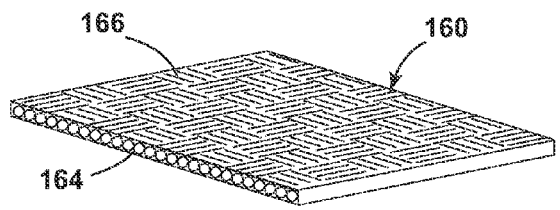
FIG. 20 is a to perspective cross-sectional view of another alternate embodiment of the reinforcement tape of the fabric member having a single woven layer of tension-resisting fibers.

Referring now to FIG. 20, in various alternate embodiments, it is contemplated that a single layer of reinforcement tape 160 may be made of several individual tension-resisting fibers 164 that are placed across one another or woven in two or more angular directions, within the single layer of reinforcement tape 160. In such an embodiment, a single layer of reinforcement tape 160 may provide the tension-resisting properties necessary for the structural requirements of the fabric member 20 to be placed within the fabric substrate armrest 10.

According to various embodiments, where the fabric member 20 is made of two or more layers 166 of reinforcement tape 160, it is contemplated that each primary axis 162 and tension-resisting fibers 164 of each of the layers 166 of reinforcement tape 160 can be aligned parallel with one another, such that the various layers 166 of reinforcement tape 160 can cooperate to provide a greater tensile strength in a single direction. Additionally, the plurality of layers 166 of reinforcement tape 160 can be disposed in more than one direction where two or more layers 166 of reinforcement tape 160 are oriented to provide additional tensile strength in each direction that tensile strength is desired, according to the particular design of the fabric substrate armrest 10.

Figure 21:
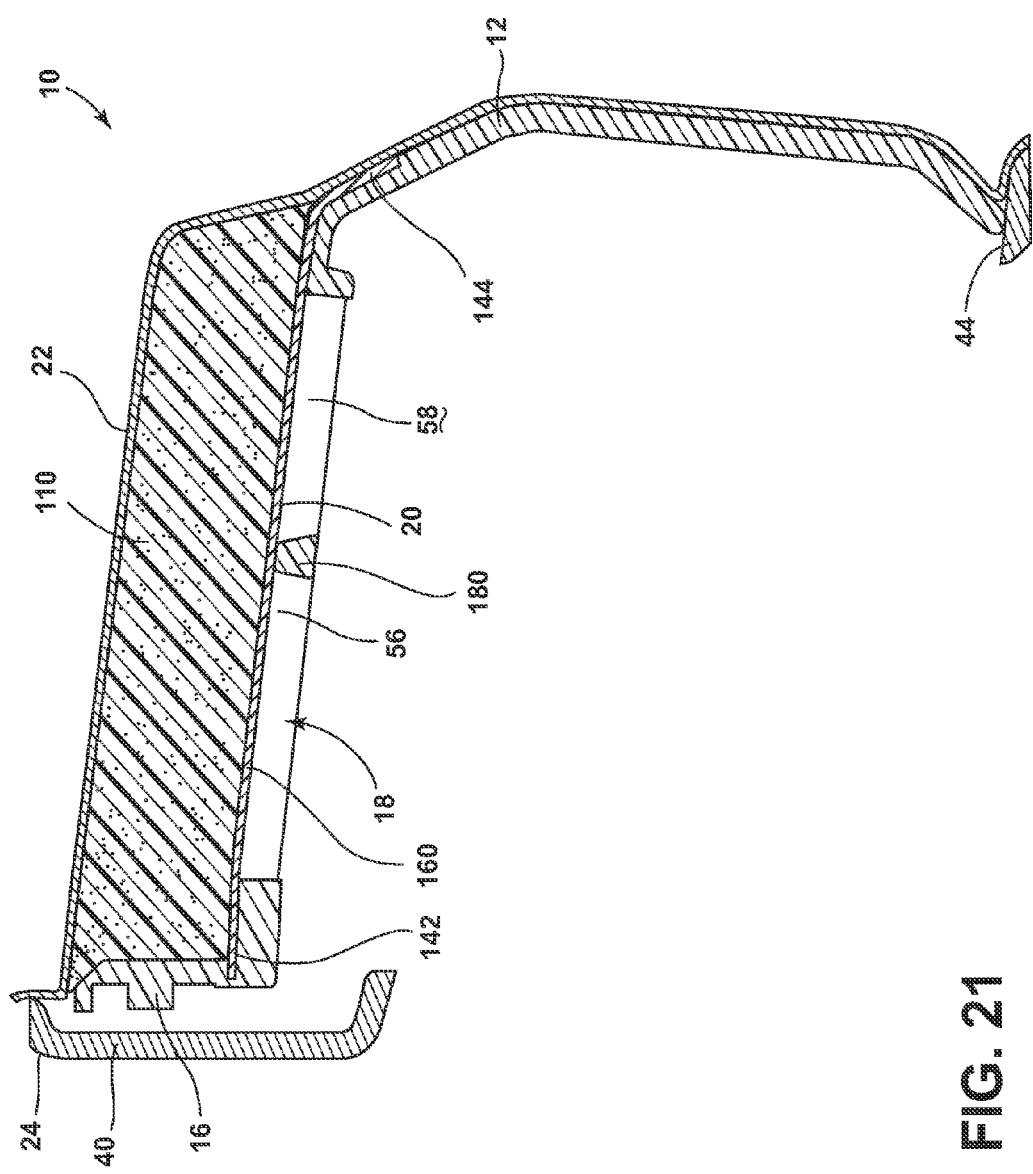
FIG. 21 is a cross-sectional view of another alternate embodiment of the fabric substrate armrest with the fabric member molded into portions of the inner and outer armrest substrates in a cushion member disposed between the cover member and the fabric member.
Figure 22:
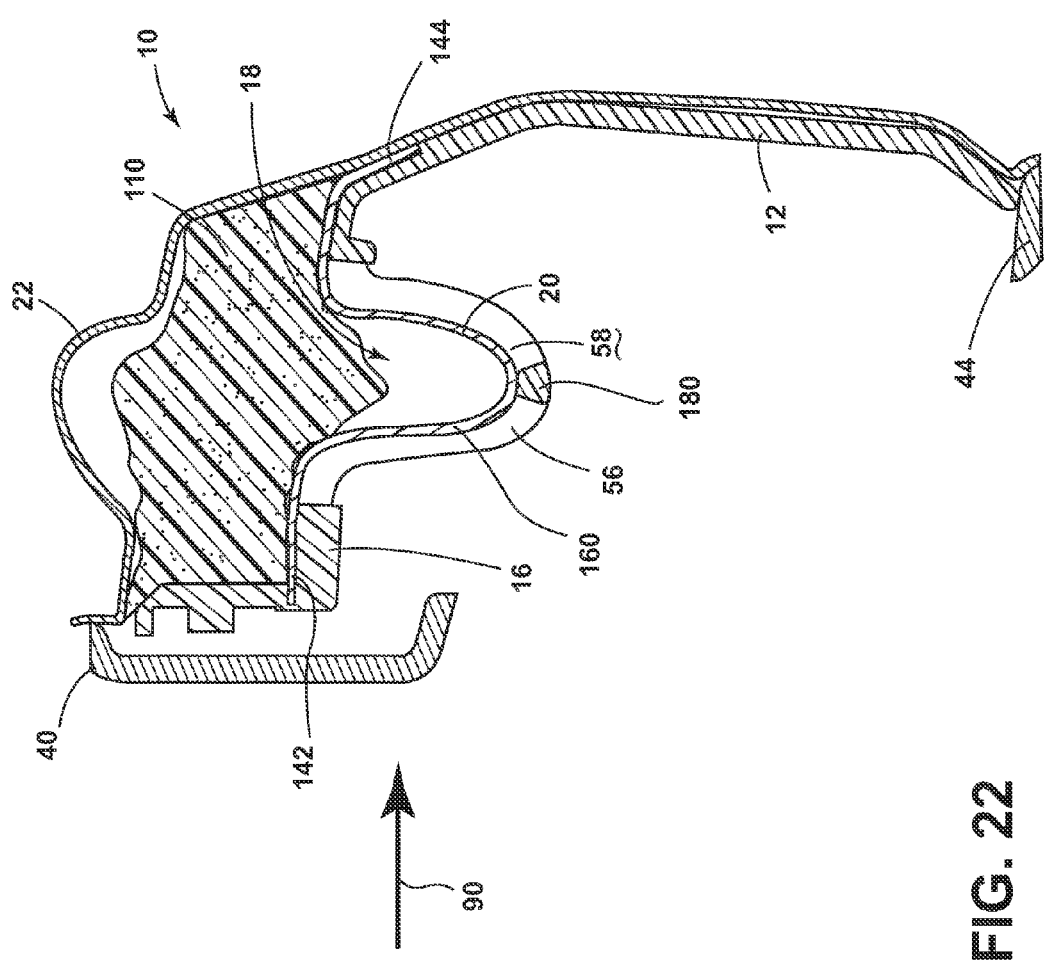
FIG. 22 is a cross-sectional view of the fabric substrate armrest of FIG. 18 with a side impact load applied to the armrest.

Referring now to the embodiment illustrated in FIGS. 21 and 22, in embodiments where the fabric member 20 is tensioned across the gap 18 defined between the inner and outer armrest substrates 12, 16 and the fabric member 20 is molded within the inner and outer armrest substrates 12, 16, the buckling member 14 that at least partially defines the gap 18 within the fabric substrate armrest 10 can include the first buckling member 50 that defines the front boundary 54 of the gap 18 and the second buckling member 56 that defines the rear boundary 58 of the gap 18. Additionally, where greater vertical support is necessary to support the arm of the occupant within the passenger cabin of the vehicle 26, at least one support member 180, such as the lateral bar 120, can be disposed within the gap 18 that extends across the gap 18 between the first and second buckling members 50, 56. In such an embodiment, the at least one support member 180 is free of engagement with the inner and outer armrest substrates 12, 16 of the fabric substrate armrest 10. Accordingly, the tensioned fabric member 20 and the at least one support member 180 can provide vertical support for the arm of the occupant of the vehicle 26 proximate the respective vehicle door 24. At the same time, a lateral force 90 exerted upon the fabric substrate armrest 10 during an impact condition can be absorbed by the movement of the inner and outer armrest substrates 12, 16 toward each other as well as the progressive collapsing of the first and second buckling members 50, 56 during the impact condition. In this manner, the fabric member 20 that is molded within the inner and outer armrest substrates 12, 16, as well as the various support members 180 that extend across the gap 18, provide minimal, if any, lateral support to the fabric substrate armrest 10 that may interfere with or strengthen the ability of the inner and outer armrest substrates 12, 16 and the first and second buckling members 50, 56 to absorb the lateral force 90 during the impact condition. It is contemplated that in embodiments where the fabric member 20 is molded into the inner and outer armrest substrates 12, 16, additional fixing mechanisms are generally not necessary to fasten the fabric member 20 to the inner and outer armrest substrates 12, 16. Accordingly, in such embodiments, additional fixing components that may interfere with the ability of the fabric substrate armrest 10 to absorb the lateral force 90 are substantially not needed.

Referring again to FIGS. 21 and 22, it is contemplated that a cushion member 110 can be installed within the fabric substrate armrest 10 between the cover member 22 and the fabric member 20 to provide additional cushioning to the arm of the occupant during use of the vehicle 26. In such embodiments, it is contemplated that the cushion member 110 can be capable of compressing in the lateral direction such that the cushion member 110 will not substantially strengthen the fabric substrate armrest 10 such that the movement of the inner and outer armrest substrates 12, 16 toward one another during an impact condition is substantially impeded as a result of the cushion member 110. In the various embodiments incorporating a cushion member 110, at least one under-cushion vertical support member 180 that extends across the gap 18 between the first and second buckling members 50, 56 can be installed. In this embodiment, the under-cushion vertical support member 180 is free of engagement with the inner and outer armrest substrates 12, 16. Where the cushion member 110 is used, the cover member 22 of the fabric substrate armrest 10 extends over the cushion member 110 and the fabric armrest substrate 10. In this manner, the cover member 22 is at least partially supported from below by the fabric member 20 of the fabric substrate armrest 10.

According to various embodiments, instead of a cushion member 110, or in addition to a cushion member 110, the fabric substrate armrest 10 can include a secondary fabric member that extends over the fabric member 20 that is molded into the inner and outer armrest substrates 12, 16. The secondary fabric member provides additional vertical support to the user's arm. In such embodiments, the secondary fabric member can be connected to the inner and outer armrest substrates 12, 16 through adhesive or mechanical methods described above and as shown in FIGS. 3-15.

Referring again to the various embodiments illustrated in FIGS. 16-24, where the fabric member 20 is at least partially molded within the inner and outer armrest substrates 12, 16, it is contemplated that the fabric member 20 can be placed within a mold 190 and set to the predetermined tension 140 according to the design parameters of the particular fabric substrate armrest 10 to be used in the door 24 of the vehicle 26. Once the predetermined tension 140 is determined, the fabric member 20 can be placed within the mold 190 and the first and second fabric edges 142, 144 of the fabric member 20 can be pulled away from one another to place the fabric member 20 at the predetermined tension 140. Once the fabric member 20 is appropriately tensioned within the mold 190, various portions of the mold 190 can be engaged to form the various molding cavities 192 for forming the inner and outer armrest substrates 12, 16, as well as other components of the fabric substrate armrest 10 that are capable of being molded. Once the mold 190 is positioned in the proper configuration, the formable material 194 can be placed within the molding cavities 192 to be formed into the shape of the inner and outer armrest substrates 12, 16 and the other formable components of the fabric substrate armrest 10. The type of molding methods that can be used can include, but are not limited to, injection molding, compression molding, blow molding, and other molding methods that can be used to form the inner and outer armrest substrates 12, 16.

Referring again to FIGS. 16-24, as the various components of the fabric substrate armrest 10 are molded, the formable material 194 extends around at least a portion of the first and second fabric edges 142, 144 of the fabric member 20. In this manner, the first and second fabric edges 142, 144 of the fabric member 20 are substantially fixed within the inner and outer armrest substrates 12, 16 and set at the predetermined tension 140. As discussed above, the predetermined tension 140 can vary depending upon the various factors that can include, but are not limited to, the design of the door, the particular vehicle, the driving conditions that the vehicle is intended to encounter, the positioning of the door within the passenger cabin, the materials included within the fabric substrate armrest 10, and other various factors that can affect the structural integrity of the fabric substrate armrest 10 and the ability of the fabric substrate armrest 10 to absorb lateral forces during impact conditions. According to the various embodiments, the formable material 194 that can be used to create the inner and outer armrest substrates 12, 16, and other formable components of the fabric substrate armrest 10 can include, but are not limited to, plastic, polymers, formable metals, combinations thereof and other similar formable materials 194 that can be formed around the first and second fabric edges 142, 144 of the fabric member 20 during formation of the fabric substrate armrest 10.

According to the various embodiments, where it is contemplated that the fabric member 20 can be tensioned not only across the inner and outer armrest substrates 12, 16 but also across the first and second buckling members 50, 56 that define the front and rear boundaries 54, 58 of the gap 18. Accordingly, where reinforcement tape 160 is used as the fabric member 20 and the various tension-resisting fibers 164 of the reinforcement tape 160 are oriented in different directions, the tension-resisting fibers 164 of the various layers 166 of reinforcement tape 160 can resist tension in a plurality of directions to allow the fabric member 20 to be tensioned between the inner and outer armrest substrates 12, 16 and between the first and second buckling members 50, 56 of the fabric substrate armrest 10.

According to various embodiments, various portions of the fabric substrate armrest 10 can be molded through injection molding or other molding process. These moldable portions of the fabric substrate armrest 10 can include, but are not limited to, the inner and outer armrest substrates 12, 16, the first and second buckling members 50, 56, the various support members 180, as well as other components of the fabric substrate armrest 10.

Figure 25:
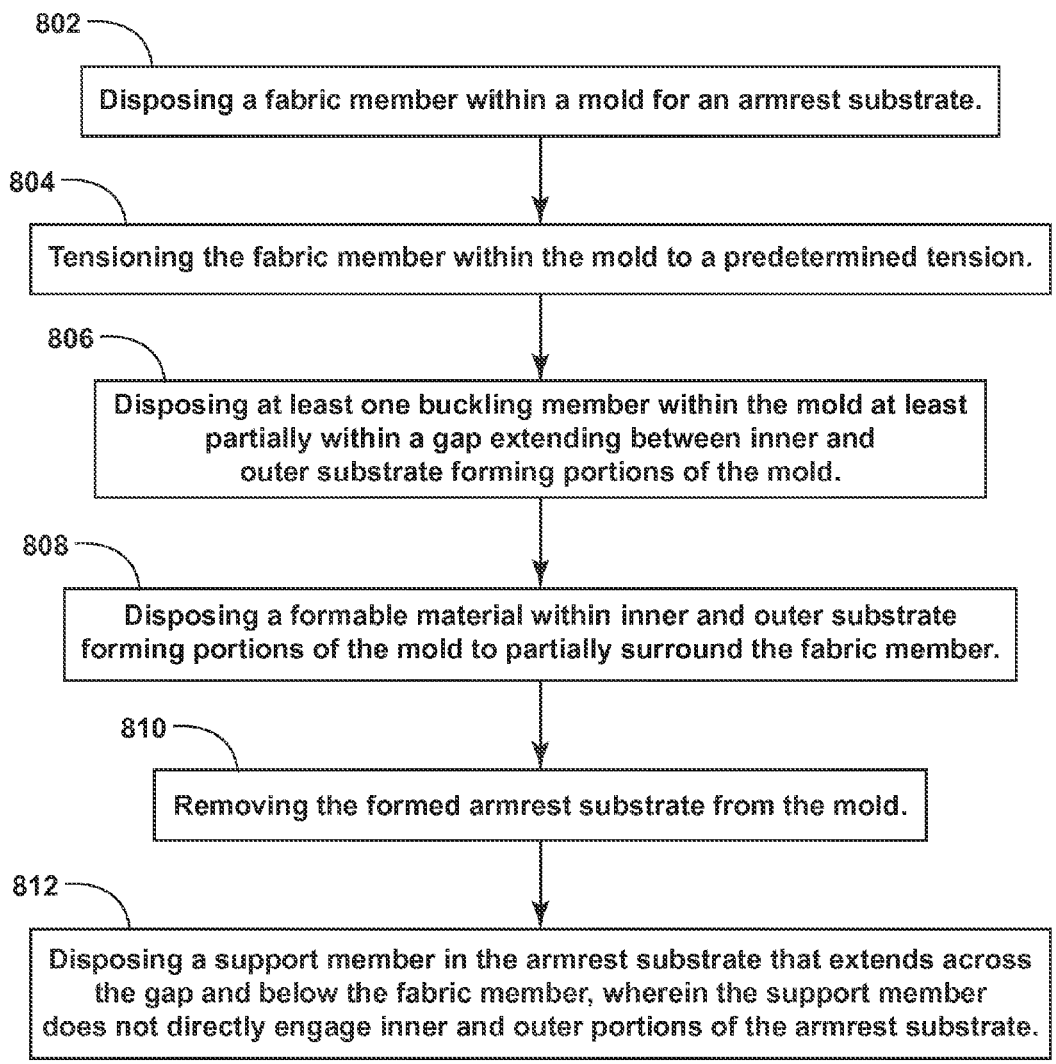
FIG. 25 is a schematic flow diagram illustrating a method for forming a fabric substrate armrest for a vehicle door.

Referring now to FIGS. 23-25, having described the various embodiments of the fabric substrate armrest 10 that are formed using a mold 190 to create the various components of the fabric substrate armrest 10, a method 800 is disclosed for forming a fabric substrate for a vehicle armrest, according to one embodiment. A first step 802 of the method 800 includes disposing a fabric member 20 within a mold 190 for the fabric substrate armrest 10. Once disposed therein, the various edges of the fabric member 20 can be disposed within a tensioning mechanism that is configured to stretch the fabric member 20 within the mold 190 to place the fabric member 20 under the predetermined tension 140 required by the particular design of the fabric substrate armrest 10. Once disposed within the mold 190 and placed within the tensioning mechanism, the fabric member 20 is tensioned within the mold 190 to the predetermined tension 140 (step 804). In tensioning the fabric member 20, the predetermined tension 140 can be achieved by either stretching the fabric member 20 itself within the mold 190, or placing the fabric member 20 within the mold 190, and then pulling the components of the mold 190 apart to place the fabric member 20 under the predetermined tension 140. Combinations of these two methods can also be used to place the fabric member 20 under the predetermined tension 140.

Referring again to FIGS. 23-25, once the fabric member 20 is placed within the mold 190 at the predetermined tension 140, at least one buckling member 14 can be disposed within the mold 190 at least partially within a gap 18 extending between inner and outer substrate-forming portions 196, 198 of the mold 190 (step 806). In this manner, the first and second buckling members 50, 56 can be used to set the inner and outer substrate-forming portions 196, 198 of the mold 190 at the appropriate distance from one another for forming the fabric substrate armrest 10. According to the various embodiments, it is contemplated that the buckling members 14 may be molded along with the inner and outer armrest substrates 12, 16. It is also contemplated that the various buckling members 14 can be molded in a separate molding step either before or after the inner and outer armrest substrates 12, 16 are molded. It is also contemplated that the various buckling members 14 can be integrally formed along with the remainder of the inner and outer armrest substrates 12, 16 and the fabric substrate armrest 10 as a whole. Alternatively, the buckling members 14 can be separate elements that are attached, molded or otherwise connected to the inner and outer armrest substrates 12, 16 after the inner and outer armrest substrates 12, 16 are formed.

Referring again to FIGS. 24 and 25, once the fabric member 20 and various buckling members 14 are properly positioned within and around the form, the formable material 194 can be disposed within the inner and outer substrate-forming portions 196, 198 of the mold 190 (step 808). In this manner, as the formable material 194 is disposed within the inner and outer substrate-forming portions 196, 198 to form the inner and outer armrest substrates 12, 16, the formable material 194 at least partially surrounds the fabric member 20 at the opposing first and fabric edges 142, 144 of the fabric member 20. Once the formable material 194 is disposed within the inner and outer substrate-forming portions 196, 198 and the inner and outer armrest substrates 12, 16 are formed, the fabric member 20 is substantially held in place between the inner and outer armrest substrates 12, 16 at the predetermined tension 140. Once the formable material 194 is set, the formed fabric substrate armrest 10 can be removed from the mold 190 (step 810). The removed fabric armrest substrate 10, according to various embodiments can form a unitary fabric-based armrest structure that can be installed into a variety of vehicles 26. Once removed, according to various embodiments, one or more support members 180 can be disposed in the fabric armrest substrate 10 to extend across the gap 18 and below the fabric member 20 (step 812). In this manner, the support members 180 are placed across the gap 18 such that they do not directly engage the inner and outer portions of the fabric armrest substrate 10. In various embodiments, it is contemplated that one or more support members 180 can be included across the gap 18, depending upon the design needs of the particular fabric substrate armrest 10 being formed. Additionally, it is contemplated that additional buckling members 14 in addition to the first and second buckling members 50, 56, can be placed within the gap 18 and extending between the inner and outer armrest substrates 12, 16. In this manner, the various buckling members 14 can divide the gap 18 into a plurality of gaps 18, where the fabric member 20 extends across each of the plurality of gaps 18.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle armrest comprising:
a tensioned fabric member extending across and over inner and outer armrest substrates that are formed flush with and under the tensioned fabric member, the tensioned fabric member also extending across a gap defined between the inner and outer armrest substrates, wherein the tensioned fabric member and each of the inner and outer armrest substrates define a continuous top surface of a unitary fabric-based armrest, wherein the tensioned fabric member is tensioned throughout an entire engagement with each of the inner and outer armrest substrates;
first and second buckling members extending across the gap between the inner and outer armrest substrates and defining front and rear edges of the gap, respectively, wherein the first and second buckling members are integrally formed with the inner and outer armrest substrates around the tensioned fabric member;
a support member extending parallel with the inner and outer armrest substrates, the support member positioned under the tensioned fabric member and supporting the tensioned fabric member from below; and
a cover member extending over and vertically supported by the tensioned fabric member.

2. The armrest of claim 1, wherein the inner and outer armrest substrates are injection molded members extending around and under opposing first and second edges of the tensioned fabric member, wherein the inner and outer armrest substrates are free of engagement with an upper surface of the tensioned fabric member, and wherein the first and second buckling members are injection molded members extending under the tensioned fabric member, wherein the inner and outer armrest substrates are injection molded into direct engagement with tensioned portions of the tensioned fabric member and wherein the engagement of the tensioned fabric member with the inner and outer armrest substrates is free of mechanical fasteners.

3. The armrest of claim 1, further comprising:
a cushion member disposed upon the tensioned fabric member and vertically supported by the tensioned fabric member, wherein the cushion member is disposed under the cover member.

4. The armrest of claim 1, wherein the tensioned fabric member includes at least two layers of reinforcing tape, wherein each layer of reinforcing tape includes tension resisting fibers oriented along a primary axis of a respective layer of reinforcing tape, wherein at least one primary axis is positioned parallel with the first and second buckling members, and wherein at least one primary axis is positioned parallel with the inner and outer armrest substrates.

5. The armrest of claim 4, wherein the support member extends across the gap between the first and second buckling members and is free of engagement with the inner and outer armrest substrates, and wherein the at least one support member is positioned below the tensioned fabric member and supports the tensioned fabric member from below.

6. The armrest of claim 1, wherein the tensioned fabric member is tensioned between the inner and outer armrest substrates at a predetermined tension, and wherein the tensioned fabric member includes at least one layer of reinforcing tape having tension resisting fibers oriented along a primary axis of each at least one layer of reinforcing tape, wherein at least one of the at least one layers of reinforcing tape is positioned to orient the primary axis to be parallel with the first and second buckling members.

7. The armrest of claim 6, wherein the tensioned fabric member is tensioned within and between the first and second buckling members.

8. The armrest of claim 7, wherein the at least one layer of reinforcement tape includes a plurality of layers of reinforcement tape, and wherein the plurality of layers are positioned such that the primary axes of the plurality of layers are disposed in at least one angular direction within the tensioned fabric member.

9. A vehicle armrest comprising:
a tensioned reinforced fabric member extending across and over inner and outer armrest substrates and first and second buckling members, respectively, that are molded flush with and under the tensioned reinforced fabric member to form a continuous upper surface of a unitary fabric-based armrest, the tensioned reinforced fabric member also extending across a gap defined between the inner and outer armrest substrates and the first and second buckling members, wherein the tensioned reinforced fabric member is tensioned within a structure of and between the inner and outer armrest substrates at a predetermined tension and defines the continuous upper surface over the structure of the inner and outer armrest substrates, wherein the inner and outer armrest substrates and the first and second buckling members are free of engagement with an upper surface of the tensioned reinforced fabric member; and
a cover member extending over and vertically supported by the tensioned reinforced fabric member.

10. The armrest of claim 9, wherein the first and second buckling members extend across the gap and between the inner and outer armrest substrates, and wherein the tensioned reinforced fabric member is tensioned in a first angular direction between inner and outer armrest substrates and tensioned in a second angular direction between the first and second buckling members.

11. The armrest of claim 10, wherein the first and second buckling members and the inner and outer armrest substrates are injection molded members formed as an integral piece.

12. The armrest of claim 10, wherein the first buckling member is disposed at a front edge of the inner and outer armrest substrates, and the second buckling member is disposed at a rear edge of the inner and outer armrest substrates, wherein the gap extends continuously between the first and second buckling members.

13. The armrest of claim 12, further comprising:
at least one under-cushion vertical support that extends across the gap between the first and second buckling members, wherein the at least one under-cushion vertical support is positioned on top of the tensioned reinforced fabric member, and is free of engagement with the inner and outer armrest substrates.

14. The armrest of claim 13, wherein the cover member extends over a cushion member and the inner and outer armrest substrates, wherein the cover member is at least partially supported from below by the tensioned reinforced fabric member.

15. The armrest of claim 13, wherein the inner and outer armrest substrates, the first and second buckling members and the at least one under-cushion vertical support are injection molded members extending around at least opposing first and second edges of the tensioned reinforced fabric member.

16. A method for forming a fabric substrate for a vehicular armrest, the method comprising the steps of:
disposing a fabric member within a mold for an armrest substrate, the mold having inner and outer substrate-forming portions;
disposing at least one support member within a portion of the mold, wherein the at least one support member extends continuously under the fabric member and is parallel with and free of engagement with the inner and outer substrate-forming portions;
disposing first and second buckling members within the mold between the inner and outer substrate-forming portions, wherein the at least one support member engages the first and second buckling members;
tensioning the fabric member within the mold to a predetermined tension, the fabric member being tensioned within and between the inner and outer substrate-forming portions, wherein the fabric member is tensioned against an interior surface of the mold within the inner and outer substrate-forming portions, wherein the tensioning is performed by moving the inner substrate-forming portion of the mold away from the outer substrate-forming portion of the mold while the fabric member is secured within the inner and outer substrate-forming portions;
disposing a formable material within inner and outer substrate-forming portions of the mold, while the fabric member remains tensioned therein, wherein the formable material at least flush with and couples with a tensioned portion of the fabric member disposed within the inner and outer substrate-forming portions of the mold, and a portion of the first and second buckling members, and wherein the formable material and the tensioned portion of the fabric member form a unitary fabric-based armrest substrate, wherein the fabric member extends across a gap defined by an inner armrest substrate formed in the inner substrate-forming portion and an outer armrest substrate formed within the outer substrate-forming portion; and
removing the unitary fabric-based armrest substrate from the mold, wherein the at least one support member supports the fabric member from below, and wherein the fabric member defines a continuous upper surface of the unitary fabric-based armrest substrate over the inner and outer armrest substrates, and wherein the inner and outer armrest substrates are free of engagement with an upper surface of the fabric member.

17. The method of claim 16, wherein the step of disposing the first and second buckling members within the mold is performed through injection molding, wherein the first and second buckling members extend at least partially around the at least one support member.

18. The method of claim 16, wherein the fabric member includes a plurality of layers of reinforcement tape, each of the plurality of layers of reinforcement tape including a primary axis, and wherein the primary axes of the plurality of layers of reinforcement tape are disposed in at least one angular direction within the fabric member.

19. The method of claim 16, wherein the step of disposing a formable material within inner and outer substrate-forming portions of the mold is performed by injection molding.

20. The method of claim 16, wherein the at least one support member and the fabric member define a surface to surface engagement such that the fabric member is slidably engaged with the at least one support member.

* * * * *